United States Patent [19]

Suzuki et al.

[11] Patent Number: 5,786,852
[45] Date of Patent: Jul. 28, 1998

[54] IMAGE PICK-UP APPARATUS HAVING AN IMAGE SENSING DEVICE INCLUDING A PHOTOELECTRIC CONVERSION PART AND A VERTICAL TRANSFER PART

[75] Inventors: Masao Suzuki, Tokyo; Kenichi Kondo, Kawasaki, both of Japan

[73] Assignee: Canon Kabushiki Kaisha, Tokyo, Japan

[21] Appl. No.: 481,838

[22] Filed: Jun. 7, 1995

[30] Foreign Application Priority Data

Jun. 20, 1994 [JP] Japan .................... 6-137318
Dec. 16, 1994 [JP] Japan .................... 6-333659

[51] Int. Cl.⁶ ............................................. H04N 5/14
[52] U.S. Cl. ............................... 348/312; 348/322
[58] Field of Search ........................... 348/311, 312, 348/314, 322, 324

[56] References Cited

U.S. PATENT DOCUMENTS

| | | | |
|---|---|---|---|
| 4,623,927 | 11/1986 | Hoshino | 358/213 |
| 4,623,928 | 11/1986 | Handy | 358/213 |
| 4,712,135 | 12/1987 | Hashimoto et al. | 358/213.22 |
| 4,963,980 | 10/1990 | Suga et al. | 358/209 |
| 5,239,380 | 8/1993 | Yokoyama | 358/213.22 |
| 5,444,484 | 8/1995 | Yutani et al. | 348/311 |

FOREIGN PATENT DOCUMENTS

| | | | |
|---|---|---|---|
| 0399601 | 11/1990 | European Pat. Off. | H04N 5/217 |
| 60141081 | 7/1985 | Japan | H04N 6/335 |
| 61-102881 | 5/1986 | Japan | H04N 5/335 |
| 05211320 | 8/1993 | Japan | H04N 5/335 |
| 05227487 | 9/1993 | Japan | H04N 5/335 |

OTHER PUBLICATIONS

I.E.E.E. 1987 Solid-State Circuits Conference, First Edition, vol. 30, Feb. 1987 NY, USA, pp. 106-107, Yamada, et al., "Session X: Image Sensors and Processing Circuits".

*Primary Examiner*—Wendy Garber
*Attorney, Agent, or Firm*—Fitzpatrick, Cella, Harper & Scinto

[57] ABSTRACT

An image pick-up apparatus includes an image sensing device which converts an optical image into an electrical signal, the image sensing device including a photoelectric conversion part and a vertical transfer part. A mode switching device switches an operation mode between a frame mode and field mode. Also included is a control device which controls the bias level and/or timing of a vertical transfer pulse depending on the operation mode selected via the mode switching device. The control device provides a predetermined amount of shift to an intermediate level of a transfer pulse used to drive a vertical transfer part adjacent to a photoelectric conversion part. The control means also provides the same amount of shift to intermediate levels of transfer pulses used to drive other vertical transfer parts. The control device further includes a plurality of shifting circuits which determine the amount of shift of the individual vertical transfer pulse, the plurality of shifting circuits being connected to a common power supply source.

5 Claims, 31 Drawing Sheets

FIG. 13(A)

| Cy | Ye | Cy | Ye | Cy | Ye | Cy | ... |
|----|----|----|----|----|----|----|-----|
|    |    |    |    |    |    |    |     |
| Cy | Ye | Cy | Ye | Cy | Ye | Cy | ... |
|    |    |    |    |    |    |    |     |
| Cy | Ye | Cy | Ye | Cy | Ye | Cy | ... |
|    |    |    |    |    |    |    |     |
| Cy | Ye | Cy | Ye | Cy | Ye | Cy | ... |
|    |    |    |    |    |    |    |     |
| Cy | Ye | Cy | Ye | Cy | Ye | Cy | ... |
|    |    |    |    |    |    |    |     |
| Cy | Ye | Cy | Ye | Cy | Ye | Cy | ... |
|    |    |    |    |    |    |    |     |
| ...| ...| ...| ...| ...| ...| ...| ... |

FIG. 13(B)

| Cy | Ye | Cy | Ye | Cy | Ye | Cy | ... |
|----|----|----|----|----|----|----|-----|
| Mg | G  | Mg | G  | Mg | G  | Mg | ... |
| Cy | Ye | Cy | Ye | Cy | Ye | Cy | ... |
| G  | Mg | G  | Mg | G  | Mg | G  | ... |
| Cy | Ye | Cy | Ye | Cy | Ye | Cy | ... |
| Mg | G  | Mg | G  | Mg | G  | Mg | ... |
| Cy | Ye | Cy | Ye | Cy | Ye | Cy | ... |
| G  | Mg | G  | Mg | G  | Mg | G  | ... |
| Cy | Ye | Cy | Ye | Cy | Ye | Cy | ... |
| Mg | G  | Mg | G  | Mg | G  | Mg | ... |
| Cy | Ye | Cy | Ye | Cy | Ye | Cy | ... |
| G  | Mg | G  | Mg | G  | Mg | G  | ... |
| ...| ...| ...| ...| ...| ...| ...| ... |

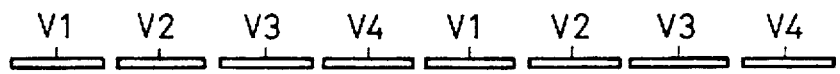
FIG. 14(A)
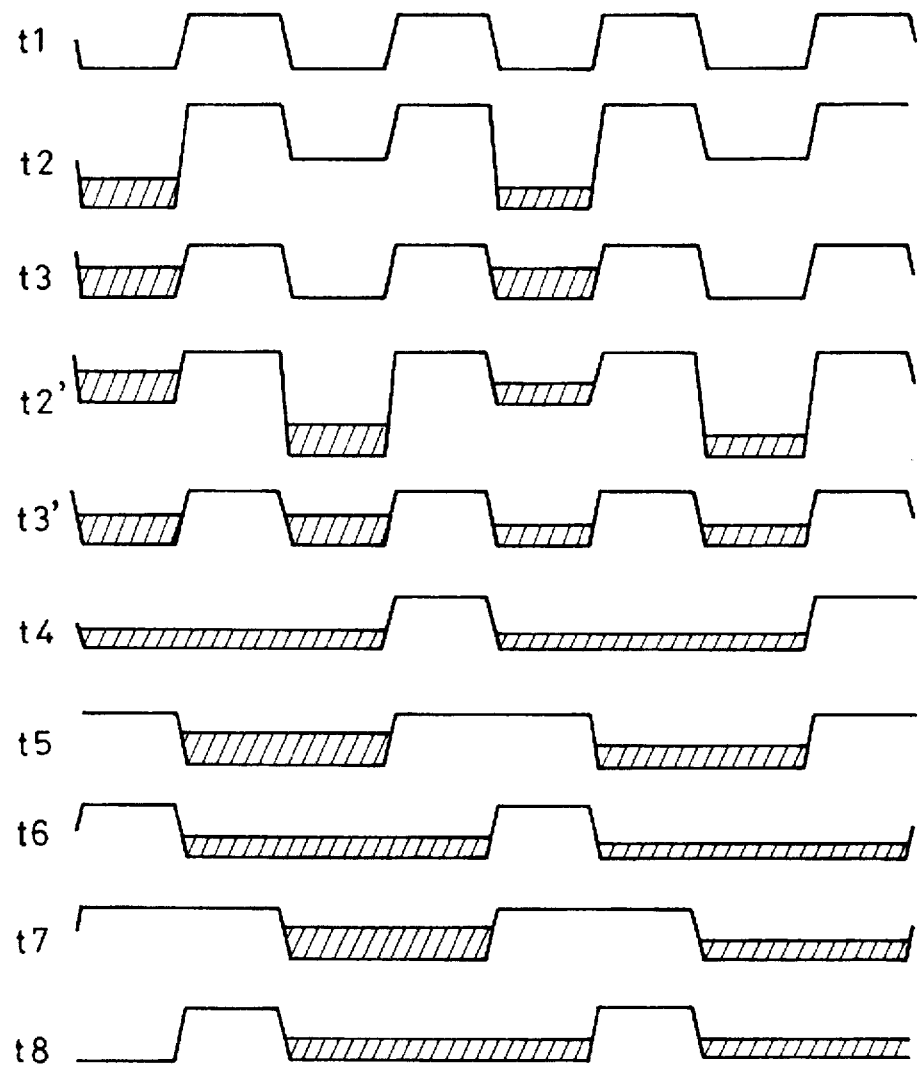
FIG. 14(B)
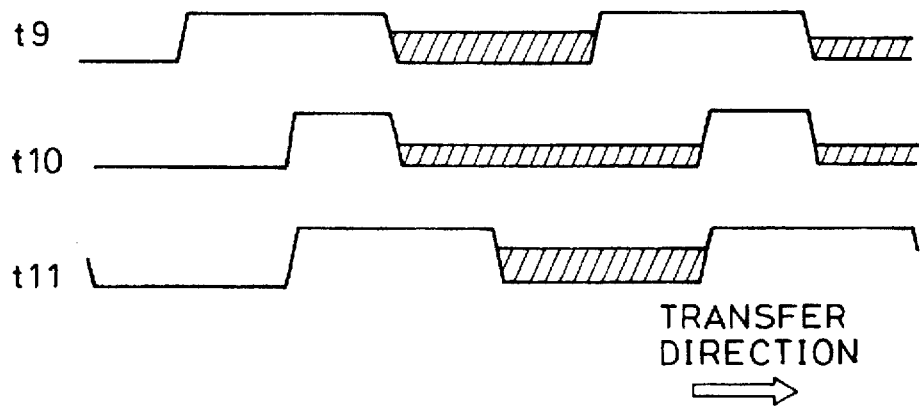
TRANSFER
DIRECTION
⇒

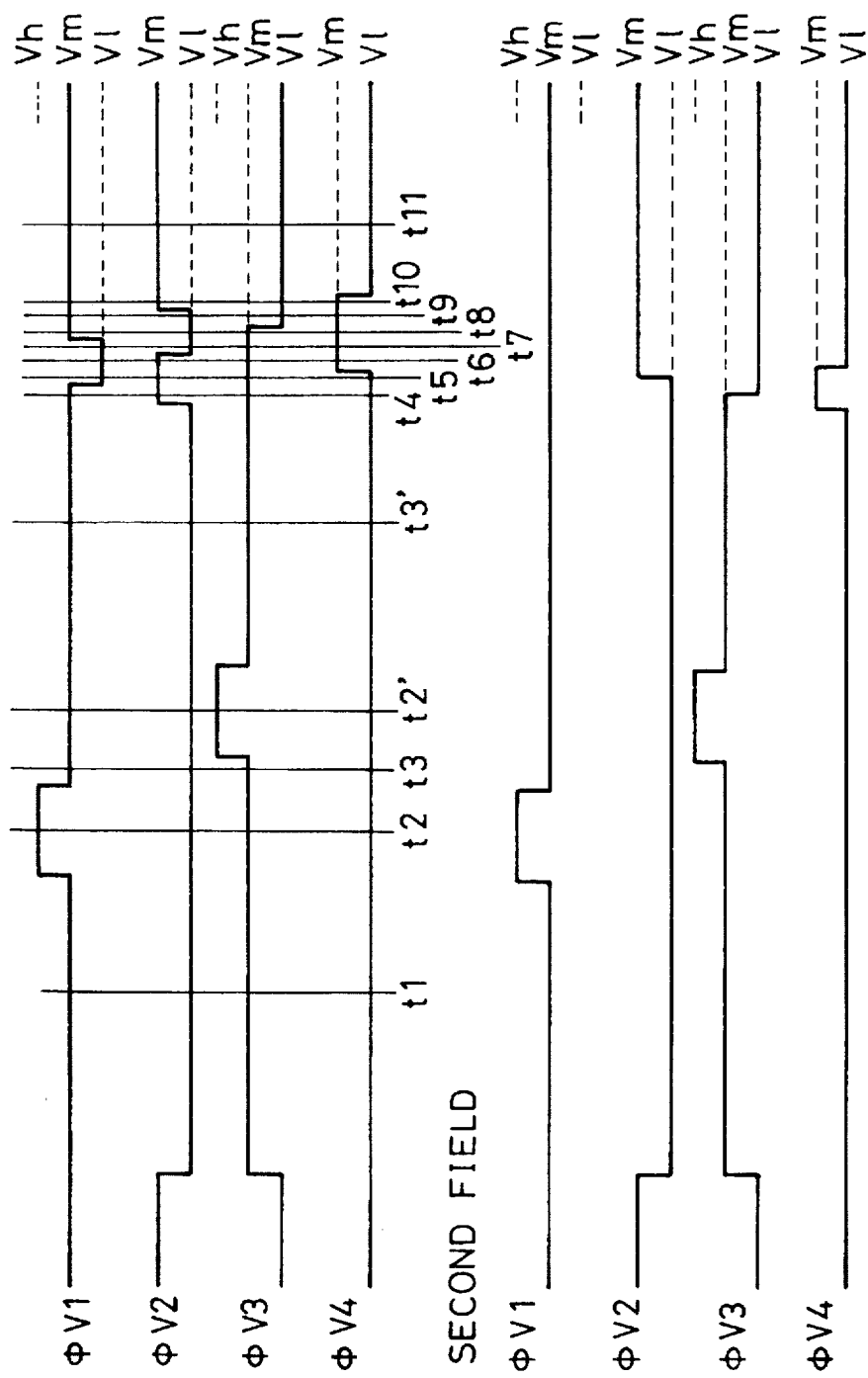

FIG. 19(1) FIRST FIELD

FIG. 19(2) SECOND FIELD

FIG. 22(1) FIRST FIELD

FIG. 22(2) SECOND FIELD

TRANSFER
DIRECTION

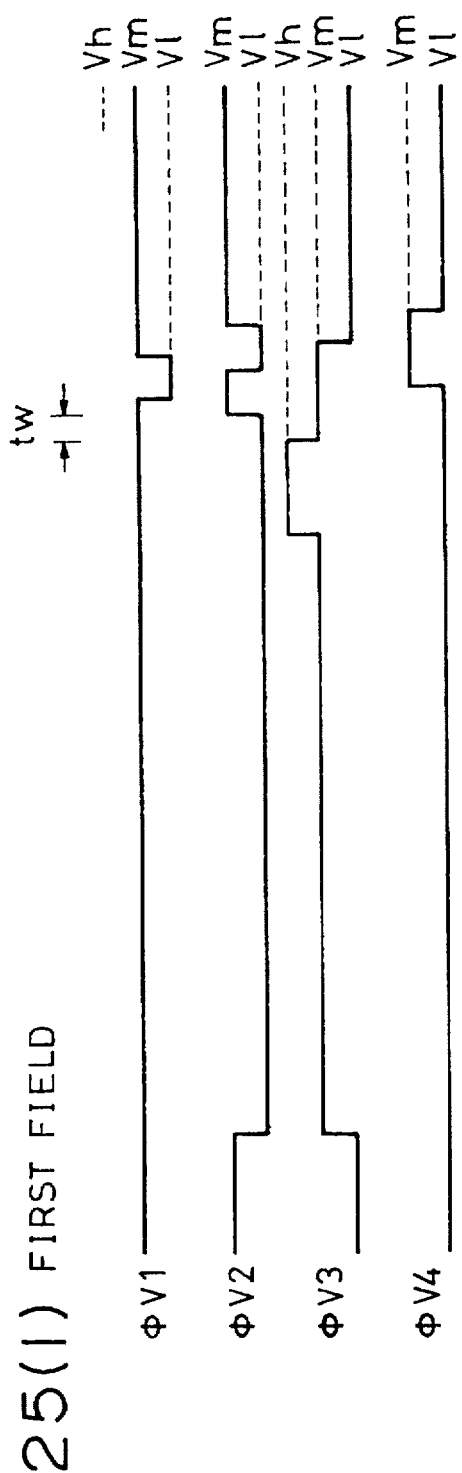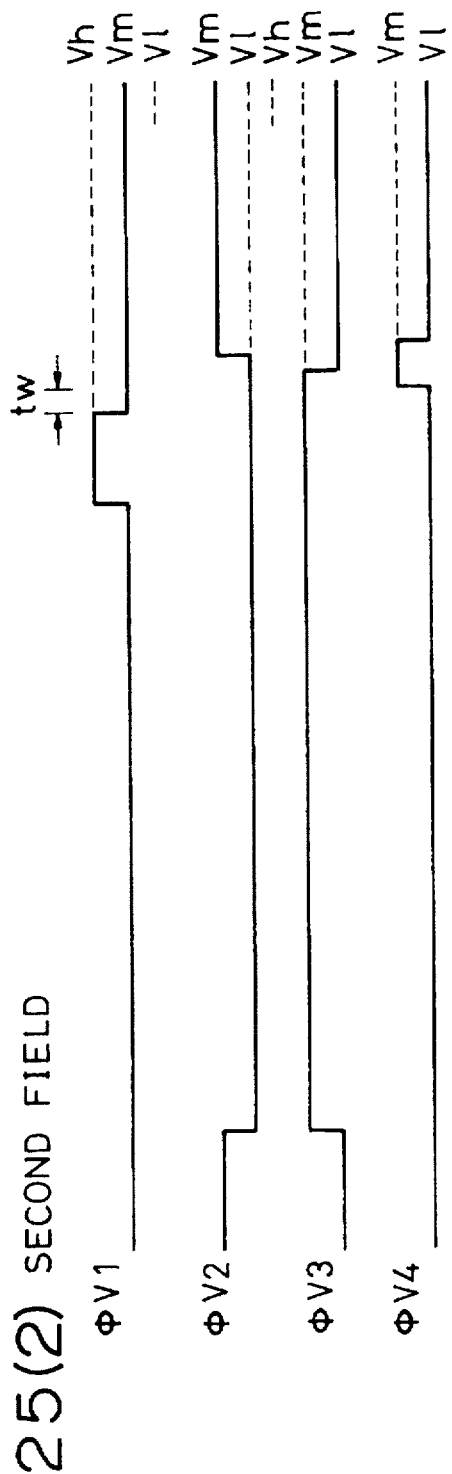
FIG. 25(1) FIRST FIELD
FIG. 25(2) SECOND FIELD

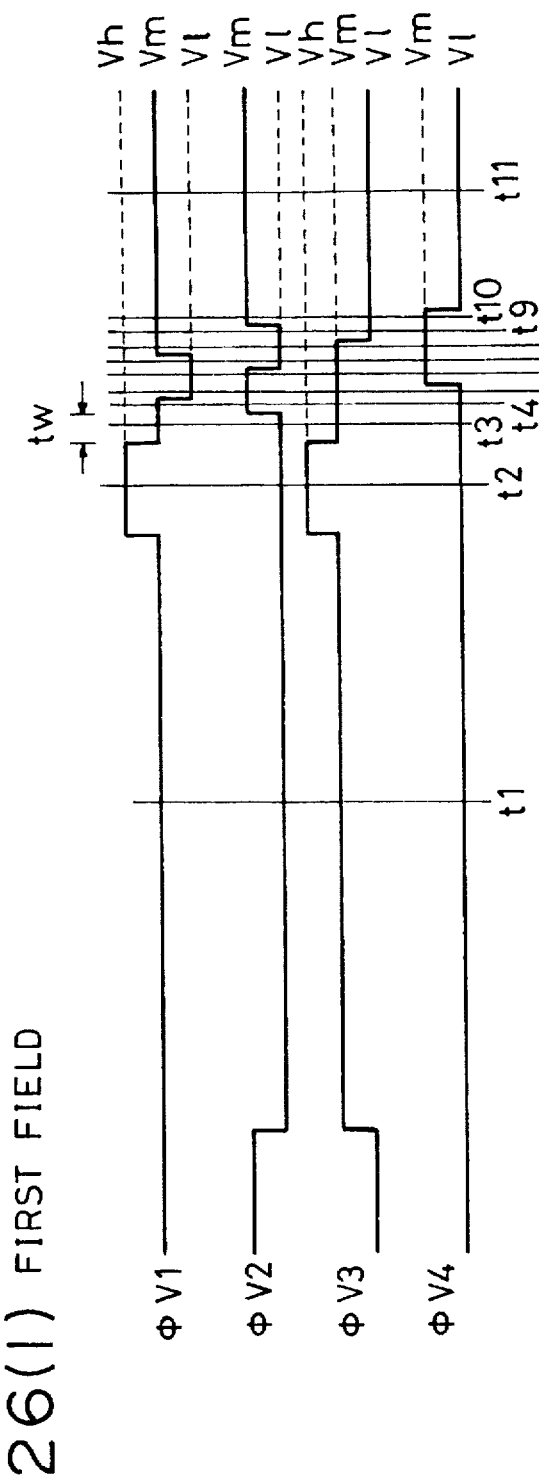
FIG. 26(1) FIRST FIELD
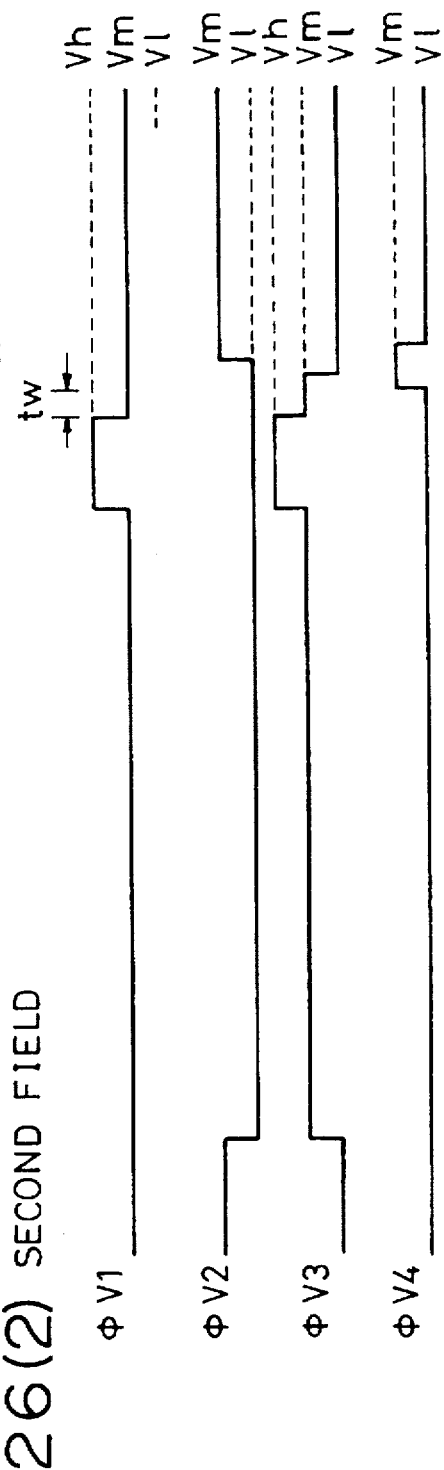
FIG. 26(2) SECOND FIELD

TRANSFER DIRECTION

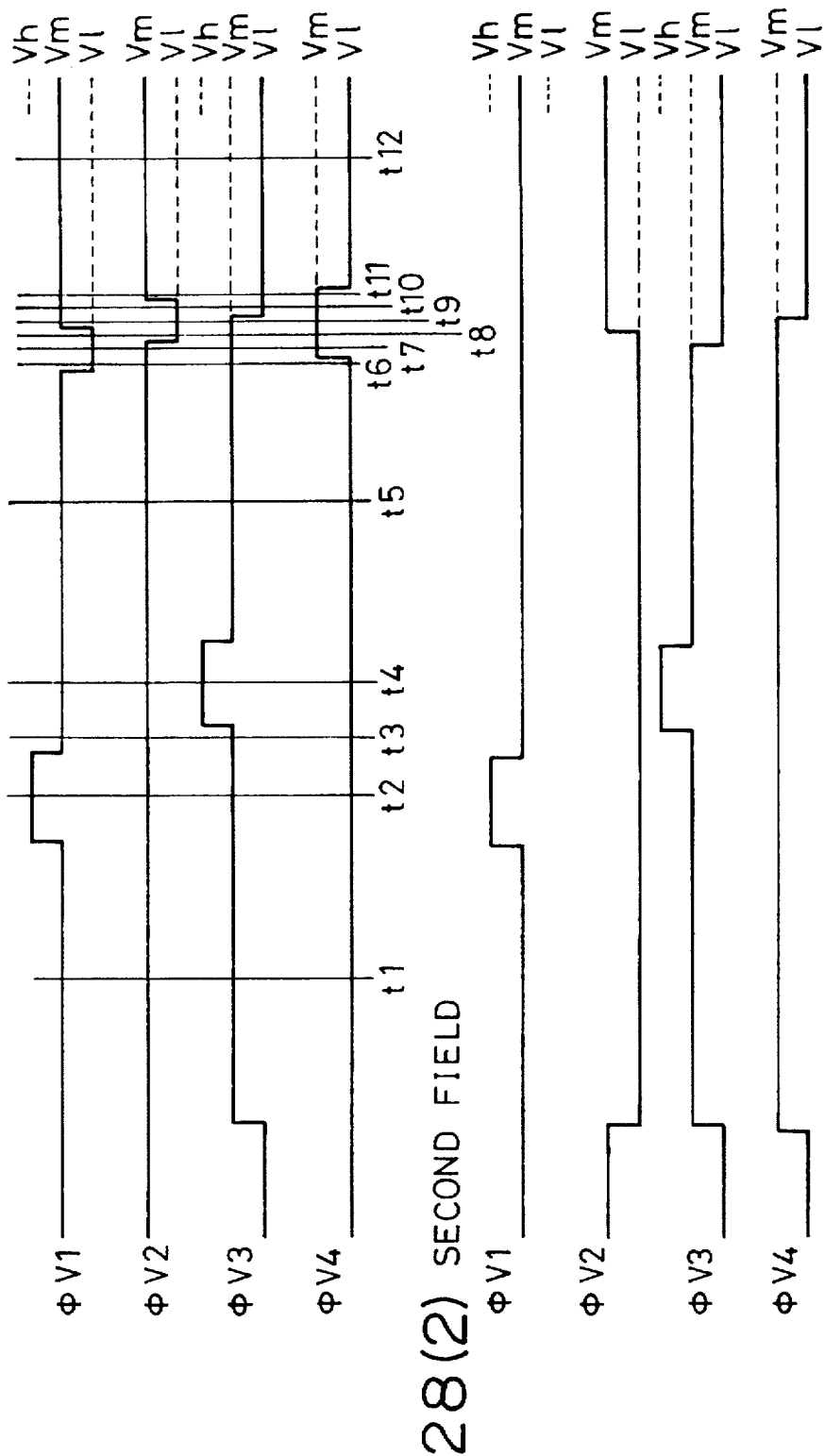
FIG. 28(1) FIRST FIELD
FIG. 28(2) SECOND FIELD

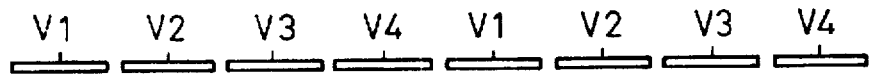
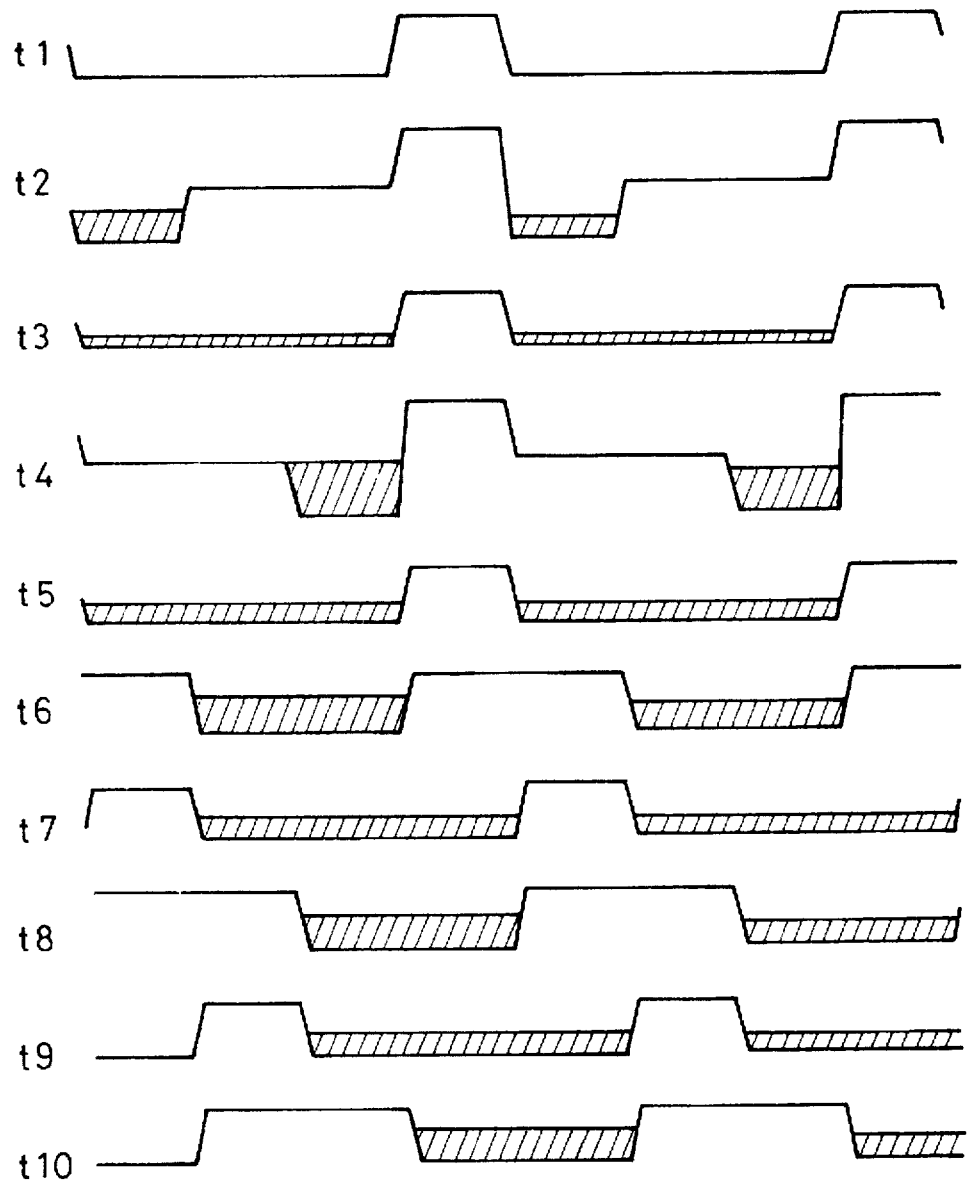
FIG. 29(A)
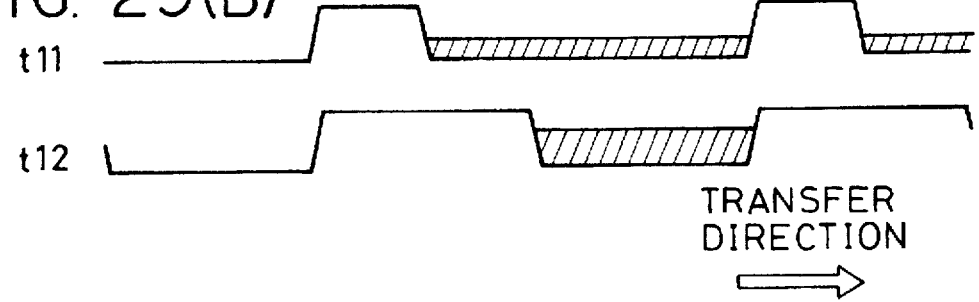
FIG. 29(B)
TRANSFER DIRECTION

IMAGE PICK-UP APPARATUS HAVING AN IMAGE SENSING DEVICE INCLUDING A PHOTOELECTRIC CONVERSION PART AND A VERTICAL TRANSFER PART

BACKGROUND OF THE INVENTION

1. Field of the Invention

The present invention relates to an image pick-up apparatus provided with a solid-state image sensing device.

2. Description of the Related Art

Video cameras and electronic cameras are very popular today. Various types of apparatus are now commercially available whereas a great number of new types of apparatus are under development. CCDs are used as an image sensing device in most of these apparatus.

FIGS. 7 to 9 illustrate the structure of a conventional CCD and its reading operation, wherein FIG. 7 illustrates the basic structure of the CCD and FIGS. 8 and 9 illustrate waveforms of timing signals used to drive the CCD.

As shown in FIG. 7(A), the CCD includes: a photoelectric conversion part 20 for converting an optical image of an object to an electric signal (signal charge); a vertical transfer part 21 for transferring the charge of each pixel in a vertical direction; a horizontal transfer part 22 for transferring each charge obtained via the vertical transfer part 21 in a horizontal direction; and an output amplifier 23 for converting the transferred charge to a signal in the form of voltage and then outputting it. An image signal is read from the CCD in different two modes. In a field reading mode (referred to also as a field mode) signals of all pixels are acquired into the vertical transfer part, signals of two pixels adjacent in the vertical direction are added together, and the resultant signals are transferred in the vertical transfer part. On the other hand, in a frame reading mode (referred to also as a frame mode), signals of pixels on odd numbered lines and those on even numbered lines are transferred separately to the vertical transfer part.

FIG. 7b is a cross-sectional view of a pixel of the image sensing device. FIG. 7c illustrates a potential profile, and FIG. 7d is a top view of electrodes. As shown, a vertical overflow drain is employed as an anti-blooming mechanism. Image sensing devices of this type has a color filter including complementary colors arranged in a checkered pattern. During a vertical blanking period, a signal obtained at each pixel by means of photoelectric conversion is transferred to a transfer stage of a corresponding vertical transfer part. Then, signals of each pair of pixels on a vertical line are added and read out. In general, as shown in FIG. 7, the above reading operation is performed in a quasi interlace fashion in which odd field reading is performed by adding pairs of pixels that are shifted by one line from those in the even field reading.

FIG. 8 illustrates waveforms of four phase vertical driving pulses V1 through V4 used in a field mode operation. A reading pulse is superimposed on the vertical driving pulses V1 and V3 every vertical period during a blanking period so that signal charges of odd numbered lines and those of even numbered lines are transferred at the same time to the vertical transfer part. Then, the vertical driving pulses V1–V4 are supplied at intervals of H (horizontal period) so that signals of the odd numbered lines and signals of the even numbered lines are added together in a predetermined manner and the resultant signals are transferred in the vertical direction. The manner of adding signals of the odd and even numbered lines is determined by the first pulse of the phase of the transfer pulses V1–V4 during a vertical period and thus a shift by amount of one pixel occurs every vertical period thereby providing an interlace effect.

FIG. 9 illustrates waveforms of driving pulse V1–V4 in a frame mode operation. In this mode, a reading pulse is added every vertical period. That is, only signals of odd numbered lines are transferred to the vertical transfer part and read out during a vertical period. Then, signals of even numbered lines are transferred to the vertical transfer part and read out during a subsequent vertical period.

In CCDs of the types used widely today, a VOD structure is employed. In this structure, unnecessary charges are swept away into deeper places of a silicon substrate thereby achieving a high sensitivity and a greater dynamic range.

In an image pick-up apparatus provided with a CCD of the above-described type, the quality of a picked-up image is sensitive to the dynamic range of the CCD. If the image sensing device (CCD) used has a narrow dynamic range, saturation occurs in the image signal when taking a picture of an object having high contrast. This results in a change in color of a portion of the image having high color saturation or results in a reduction in contrast of a portion of the image having high brightness.

In CCDs of the type widely used in video cameras, it is assumed that the reading operation is performed in the field reading mode. Therefore, the dynamic range is optimized for the field mode operation. More specifically, the maximum charge that can be stored in a stage of the vertical transfer part is set to twice the maximum charge that can be stored in a photoelectric conversion part.

If such a CCD or image sensing device is operated in a frame reading mode, one pixel of the photoelectric conversion part corresponds to one stage of the vertical transfer part and thus the dynamic range of the CCD output in the frame mode operation becomes smaller than that obtained in the field mode operation, although the vertical transfer part 21 has a high storage capacity. Since the maximum charge capacity of one pixel of the photoelectric conversion part is smaller than that of one stage of the vertical transfer part, saturation can occur in the photoelectric conversion part in the frame mode operation whereas no saturation occurs yet in the transfer part. This results in a lower saturation level in the frame mode than in the field mode.

In the CCDs of the widely-used type, as described above, since the dynamic range of one stage of the vertical transfer part is equal to the dynamic range of two combined pixels of the photoelectric conversion part, the dynamic range in the frame mode operation is as small as half that in the field mode operation.

In particular, in electronic cameras that operate in a frame mode to achieve high resolution and high picture quality, the above-described reduction in the saturation level causes serous degradation in the picture quality.

To solve the above problem, image sensing devices have been developed that allow all pixels to be read at the same time.

In image sensing devices of this type, it is assumed that the reading operation is performed pixel by pixel and thus it is possible to avoid the problem arising from the above-described imbalance between the photoelectric conversion part and the transfer part. However, the image sensing device of this type is too expensive to be used in low-cost types of image pick-up apparatus.

Another known technique to solve the problem described above is to apply a lower voltage to the silicon substrate of an image sensing device during a frame mode operation than during a field mode operation thereby expanding the maximum charge storage capacity of the photoelectric conversion part.

FIG. 7c illustrates the potential distribution from the position just under the photoelectric conversion part of the image sensing device to a position in the silicon substrate. In FIG. 7c, the solid line represents a potential distribution obtained when the substrate potential is fixed to Vsub1. In this case, the maximum storage capacity, and thus the dynamic range, of the photoelectric conversion part is determined by the depth of a potential well defined by the level 1 shown in the figure. The broken line represents a potential distribution obtained when the substrate potential is fixed to Vsub2. In this case, the maximum storage capacity is determined by the depth of a potential well defined by the level 2. As can be seen from the above discussion, the dynamic range of the image sensing device can be expanded by changing the substrate potential from Vsub1 to Vsub2.

Thus, this property of the CCD is used to expand the dynamic range in the frame mode operation by switching the substrate potential from that in the field mode operation.

As described above, if the electrical potential of the substrate of the CCD is switched in such a manner that Vsub1 is applied to the substrate in the field mode operation and Vsub2 is applied to the substrate in the frame mode operation, then the dynamic range of the photoelectric conversion part in the frame mode operation can be expanded from that in the field mode operation so that good balance in the saturation level between the photoelectric conversion part and the vertical transfer part can be obtained in the frame mode operation thereby improving the overall dynamic range of the CCD output.

However, since the above-described technique relies only on the switching of the silicon substrate potential of the CCD, the expansion of the dynamic range is not enough, and thus blooming can still occur for some objects.

SUMMARY OF THE INVENTION

It is a general object of the present invention to solve the above problems. More specifically, it is an object of the present invention to increase the saturation charge capacity of an image sensing device without the limitation by the saturation charge capacity of one charge transfer cell of VCCDs wherein the charge transfer cells also act as reading gates.

It is an another object of the present invention to provide an image sensing device having a high saturation charge capacity determined by the sum of saturation charge capacities of two adjacent charge transfer cells of VCCDs, that is, the maximum charge transfer capacity of the VCCDs and thus having a high saturation output level regardless of whether the operation is performed in the field reading mode or in the full frame reading mode thereby expanding the dynamic range of the image sensing device, and thus providing an image pick-up apparatus capable of taking a high-quality picture with a high signal-to-noise ratio.

It is still another object of the present invention to increase the saturation charge capacity of an interline-type CCD used in various applications when operated in the full frame reading mode, thereby increasing the dynamic range when the CCD is used as an image sensing device.

The above problems are solved by the present invention having various aspects and features described below.

According to a first aspect of the present invention, there is provided an image pick-up apparatus comprising:

an image sensing device for converting an optical image into an electrical signal, the image sensing device including a photoelectric conversion part and a vertical transfer part;

mode switching means for switching an operation mode between a frame mode and field mode; and control means for controlling the bias level and/or a timing of a vertical transfer pulse depending on the operation mode selected via the mode switching means; thereby expanding the dynamic range and thus preventing relating problems such as blooming.

In particular, it is possible to expand the dynamic range of a CCD even in the frame mode to a desirable level by varying the pulse width and various setting voltages depending on the operation mode. Therefore, a high-quality general-purpose image sensing device can be achieved without adding any special expensive circuits.

According to another aspect of the present invention, the voltage applied to the substrate is also varied depending on the operation mode thereby achieving further expansion of the dynamic range and thus preventing more effectively relating problems such as blooming.

According to still another aspect of the present invention, all levels of pulses used to drive the vertical transfer part are shifted by substantially the same amount so as to expand the dynamic range without reducing the vertical transfer efficiency, and thus without degradation in picture quality.

According to a further aspect of the present invention, circuits for determining the above parameters of pulses applied to the vertical transfer part have a power source used in common by all these circuits, and furthermore all these circuits have similar temperature characteristics thereby minimizing the influence of temperature on the dynamic range and the transfer efficiency.

Furthermore, the voltage applied to the substrate of the image sensing device is also switched thereby expanding the dynamic range further and preventing problems such as blooming.

According to another aspect of the present invention, there is provided an image pick-up apparatus comprising:

a plurality of photoelectric conversion cells;

charge transfer means including charge transfer cells wherein the number of the charge transfer cells is greater than the number of the photoelectric conversion cells; and control means for controlling the operation of transferring signal charges from the photoelectric conversion cells to the charge transfer means according to a procedure including the steps of: forming a plurality of potential wells by a plurality of charge transfer cells; and transferring a signal charge from each photoelectric conversion cell to a potential well formed at a position corresponding to each photoelectric conversion cell.

According to still another aspect of the present invention, there is provided an image pick-up apparatus comprising:

a plurality of photoelectric conversion cells;

charge transfer means including charge transfer cells wherein the number of the charge transfer cells is greater than the number of the photoelectric conversion cells; and control means for controlling the operation of transferring signal charges from the photoelectric conversion cells to the charge transfer means according to a procedure including the steps of: forming a potential well in a charge transfer cell disposed at a position corresponding to each photoelectric conversion cell; transferring a signal charge from each photoelectric conversion cell to the potential well formed at the position corresponding to each photoelectric conversion cell; and then immediately applying a predetermined voltage to a transfer cell adjacent to each potential well thereby increasing the capacity of each potential well.

According to further aspect of the present invention, there is provided a method of driving an image sensing device, the image sensing device including a plurality of photoelectric conversion cells and charge transfer means including a plurality of charge transfer cells wherein the number of the charge transfer cells is greater than the number of the photoelectric conversion cells, the method being characterized in that a signal charge is transferred from each photoelectric conversion cell to the charge transfer means according to a procedure including the steps of:

forming a plurality of potential wells by a plurality of charge transfer cells; and transferring a signal charge from each photoelectric conversion cell to a potential well formed at a position corresponding to each photoelectric conversion cell.

According to another aspect of the present invention, there is provided a method of driving an image sensing device, the image sensing device including a plurality of photoelectric conversion cells and charge transfer means including a plurality of charge transfer cells wherein the number of the charge transfer cells is greater than the number of the photoelectric conversion cells, the method being characterized in that a signal charge is transferred from each photoelectric conversion cell to the charge transfer means according to a procedure including the steps of:

forming a potential well in a charge transfer cell disposed at a position corresponding to each photoelectric conversion cell;

transferring a signal charge from each photoelectric conversion cell to the potential well formed at the position corresponding to each photoelectric conversion cell; and immediately after the above step, applying a predetermined voltage to a transfer cell adjacent to each potential well thereby increasing the capacity of each potential well.

According to the present invention having various aspects described above, it is possible to achieve a great increase in the saturation charge capacity and thus the saturation output of the image sensing device in both full frame reading mode and field reading mode. This means that it is possible to achieve a video camera capable of taking a high-quality picture both in the field reading mode and in the full frame reading mode.

Other objects, aspects, and features of the invention will become more apparent from the following description of embodiments with reference to the accompanying drawings.

BRIEF DESCRIPTION OF THE DRAWINGS

FIG. 7 is a schematic diagram illustrating the basic structure of a CCD; wherein FIG. 7b is a cross-sectional view; FIG. 7c illustrates a potential distribution.

FIG. 13 is a schematic representation of data locations of a buffer memory;

FIG. 14 is a schematic representation of potential profiles of a conventional image sensing device;

FIG. 15 is a timing chart of pulses used in a conventional technique;

FIG. 25 is a timing chart of pulses used in an eighth embodiment of the invention;

FIG. 26 is a timing chart of pulses used in a ninth embodiment of the invention;

FIG. 28 is a timing chart of pulses used in a tenth embodiment of the invention; and FIG. 29 is a schematic representation of potential profiles of an image sensing device according to the tenth embodiment of the invention.

DESCRIPTION OF THE PREFERRED EMBODIMENTS

Referring to the accompanying drawings, preferred embodiments of the invention are described in detail below.

EMBODIMENT 1

Figure 1:
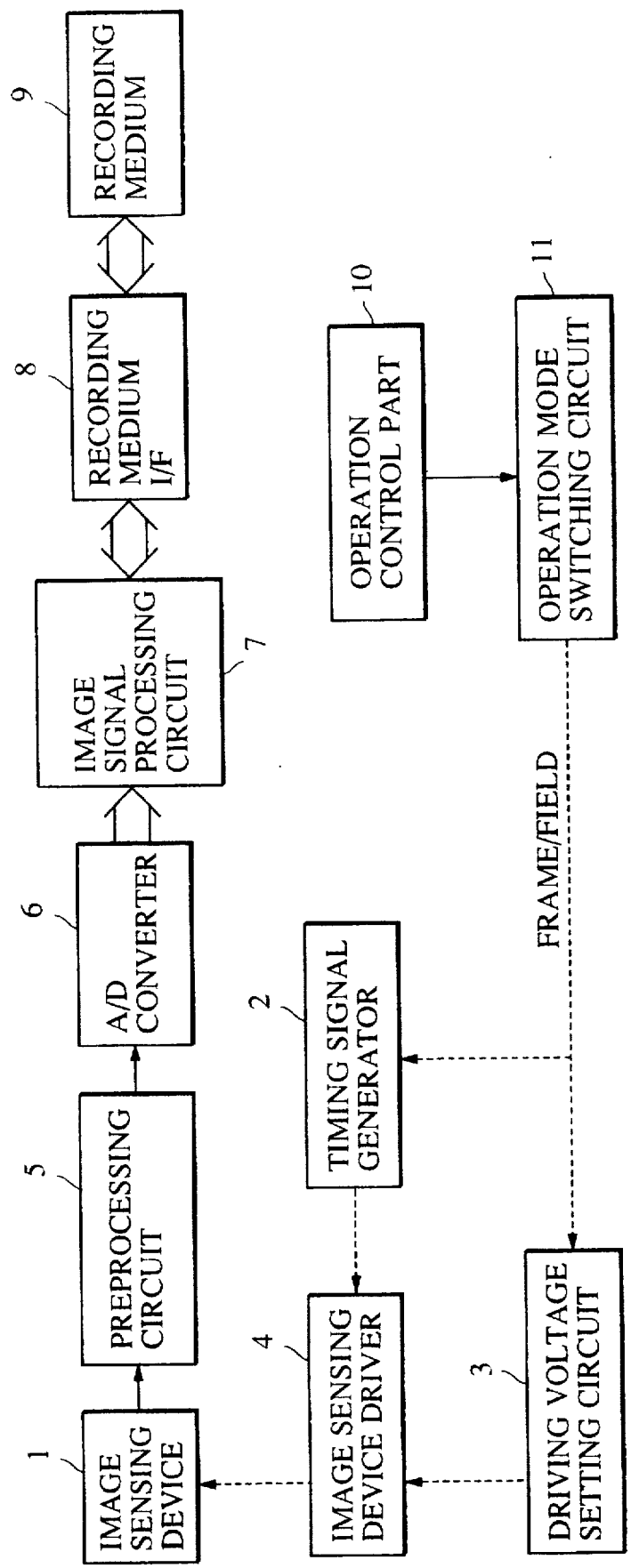
FIG. 1 is a block diagram of a first embodiment of an image pick-up apparatus according to the present invention.

FIG. 1 is a block diagram of a first embodiment of a digital camera according to the present invention.

As shown in FIG. 1, the digital camera includes: an image sensing device 1 such as a CCD for converting an optical image signal of an object to an electrical signal; a timing signal generator 2 for generating a timing signal used to control the operation of the image sensing device; a driving voltage setting circuit 3 for generating a voltage used to drive the image sensing device 1; an image sensing device driver 4 that amplifies the signal output by the timing signal generator 2 to a level sufficiently large to drive the image sensing device 1 and supplies the amplified signal to the image sensing device 1; a preprocessing circuit 5 including a CDS (correlation double sampling) circuit for reducing noise contained in the output signal of the image sensing device 1 and also including an AGC (automatic gain control) circuit; an A/D (analog-to-digital) converter 6; an image signal processing circuit 7 for processing the digital signal supplied by the A/D converter 6; a recording medium interface circuit 8 for modulating the image signal and supplying the resultant signal to a recording medium 9; an operation control part 10 via which a user can control camera operations such as starting of taking a picture and also can select the operation mode between a frame mode and field mode; a driving voltage switching circuit 11 for outputting a signal used to control the driving voltage setting circuit 3 so that a proper driving voltage is set in response to the mode specified via the operation control part 10.

The digital camera according to the present embodiment operates as follows.

First, in response to a command issued by a user via the operation control part 10, a picture-taking operation starts. An iris (not shown) is then adjusted and an electronic shutter is operated in response to the output signal of the timing signal generator and thus the image sensing device is exposed to light. The output of the image sensing device is read out and applied to the preprocessing circuit 5. In the preprocessing circuit 5, the signal is subjected to CDS and gain control processing. When the image pick-up apparatus is assembled, the gain of the gain control processing is preset to a proper value depending on the sensitivity of the image sensing device. The output signal of the preprocessing circuit 5 is applied to the A/D converter 6 and converted to a digital signal. The resultant digital signal is applied to the image signal processing circuit 7. The signal processed by the image signal processing circuit 7 is applied to the recording medium interface circuit and converted (or modulated) to a signal in a particular format. Then, the signal is recorded on a recording medium 9.

In the above picture-taking operation, the user can select via the operation control part 10 either the frame mode or field mode. If the operation mode of the camera is set to the field mode via the operation control part 10, the driving voltage setting circuit sets the driving voltage to a field mode voltage via the driving voltage switching circuit 11.

Figure 2:
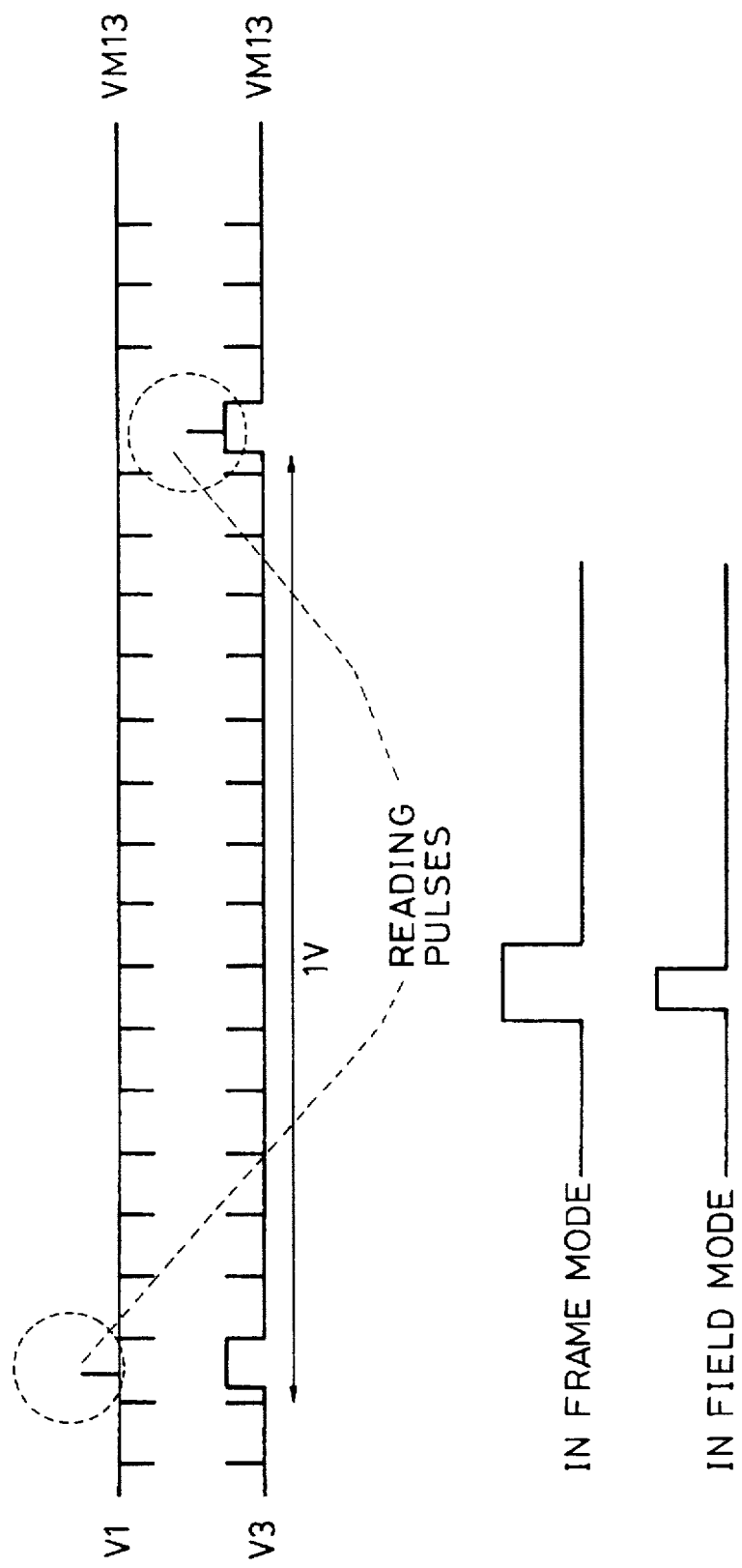
FIG. 2 is a timing chart relating to the first embodiment of the invention.

FIG. 2 illustrates waveforms of vertical transfer pulses V1 and V3 used in the frame mode operation according to the present embodiment.

In this embodiment, the operation mode of the timing signal generator 2 is switched in response to the frame mode/field mode signal supplied by the driving voltage switching circuit 11 so that reading pulses of vertical transfer pulses have a proper width corresponding to the reading operation mode. As shown in FIG. 2, the reading pulse has a greater width in the frame mode operation than in the field mode operation.

According to the present embodiment, as can be seen from the above discussion, the reading pulse has a greater width in the frame mode operation than in the field mode operation, so that charges can be transferred from the photoelectric conversion part to the vertical transfer part without any problem even in the case where the storage capacity of the photoelectric conversion part is increased by switching the substrate potential Vsub as in the conventional technique described earlier.

EMBODIMENT 2

Figure 3:
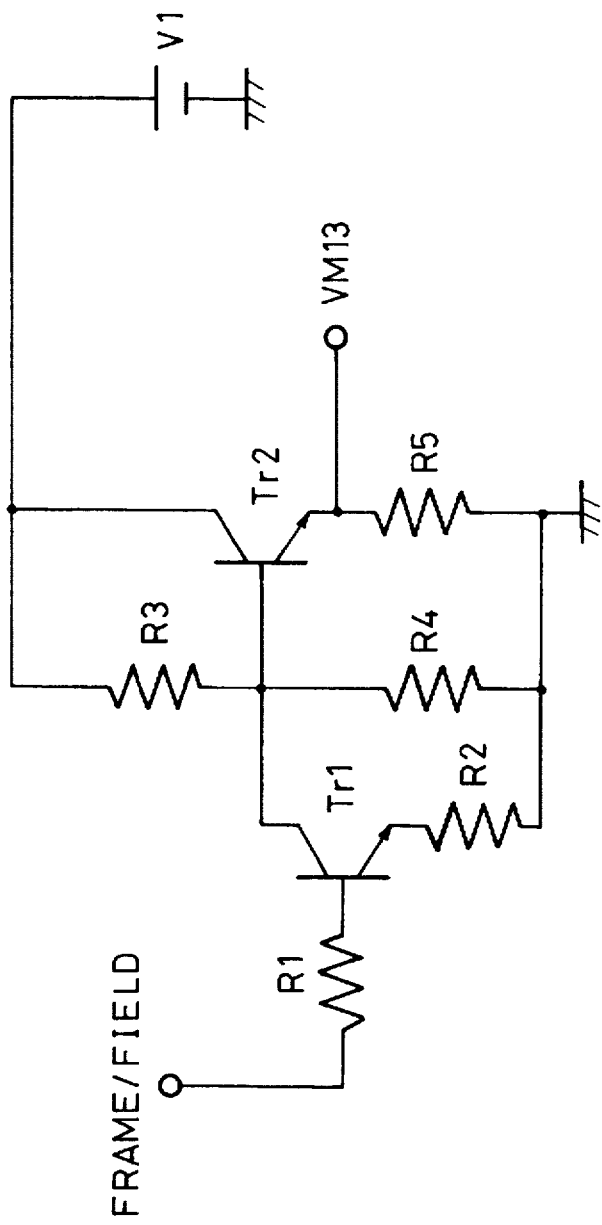
FIG. 3 is a circuit diagram relating to a second embodiment of the invention.
Figure 4:
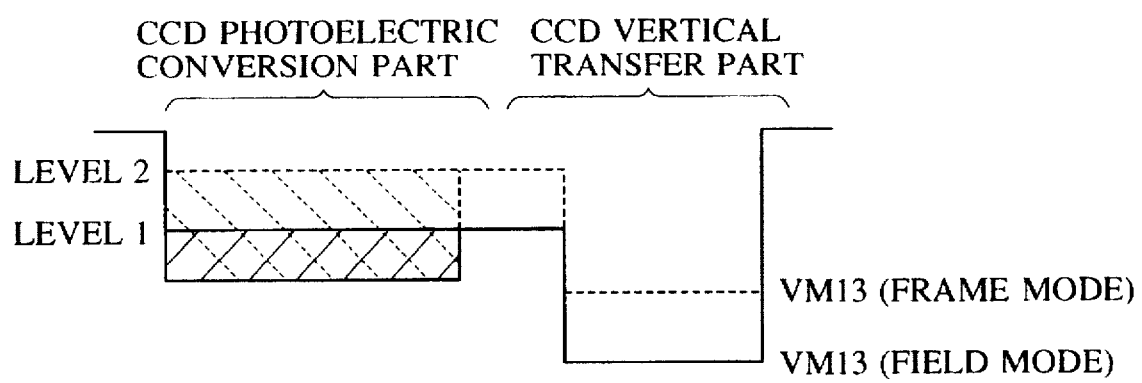
FIG. 4 is a schematic representation of a potential distribution of a CCD according to the second embodiment of the invention.

FIGS. 3 and 4 relate to a second embodiment wherein FIG. 3 illustrates an exemplary circuit implementing the driving voltage setting circuit shown in FIG. 1, and FIG. 4 illustrates the potential distribution of a photoelectric conversion part and a vertical transfer part. In FIG. 3, reference symbols R1 to R5 denote resistors, Tr1 and Tr2 denote transistors, and V1 denotes a reference voltage source.

Figure 8:
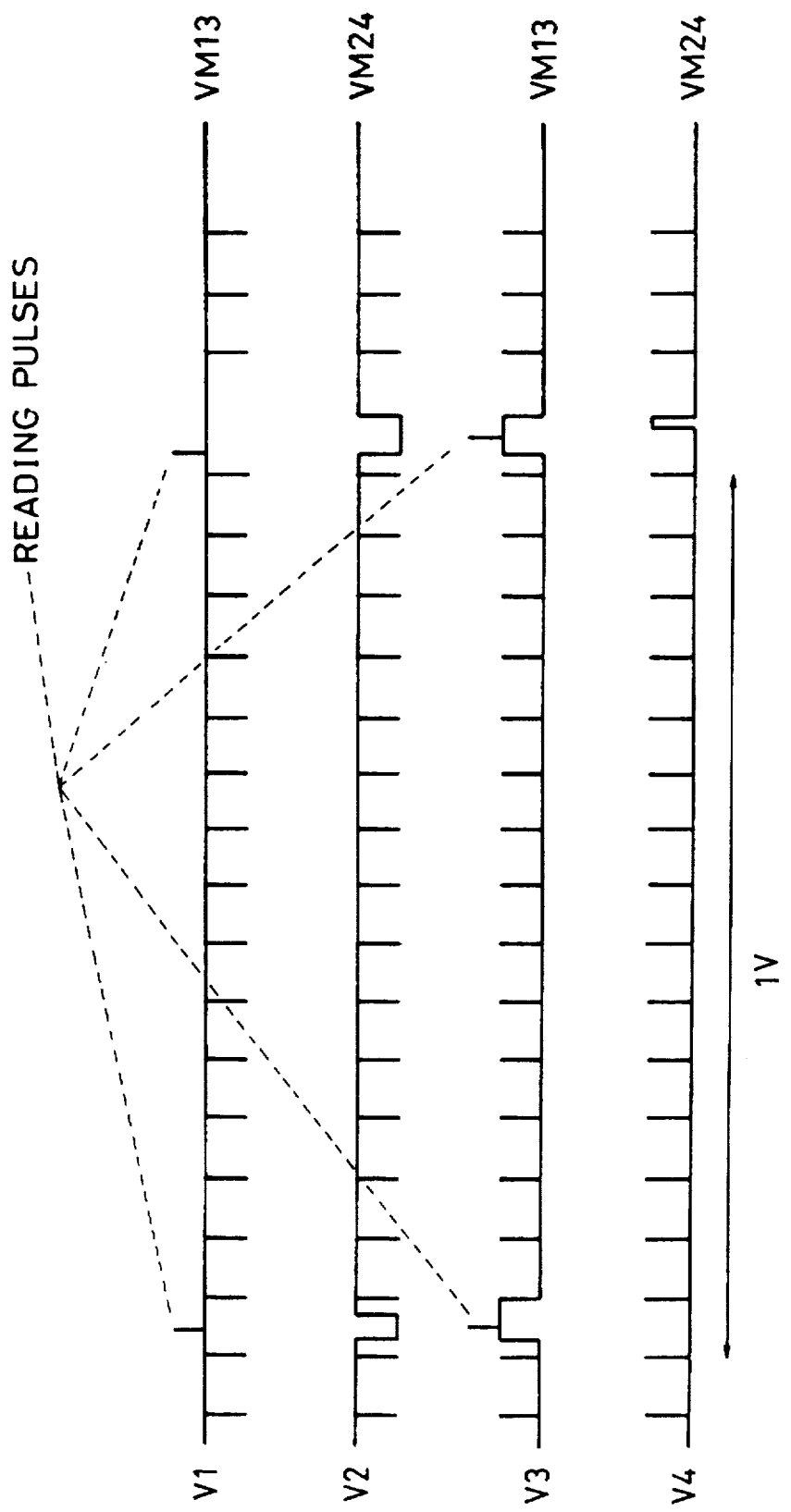
FIG. 8 is a timing chart of basic vertical transfer pulses used to drive a CCD in the field mode.
Figure 9:
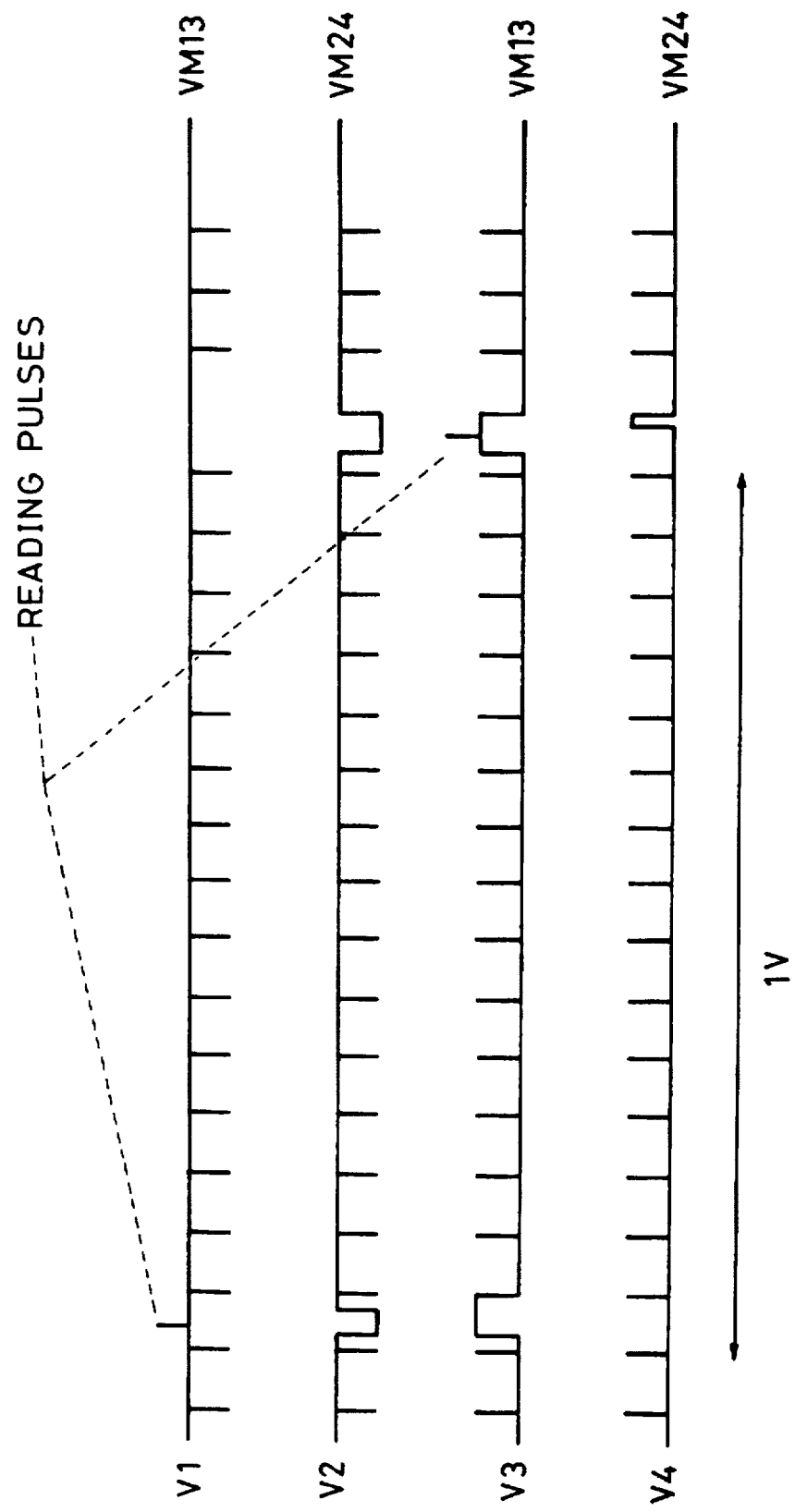
FIG. 9 is a timing chart of basic vertical transfer pulses used to drive a CCD in the frame mode.

The output voltage VM13 of the circuit including R1 to R5 and Tr1 and Tr2 determines the intermediate level of vertical transfer pulses V1 and V3 that can have three levels as shown in FIG. 8 or 9.

In the field mode operation, a low-level signal is applied as the frame mode/field mode signal to the circuit shown in FIG. 3, so that the transistor Tr2 turns off. As a result, the base level of the transistor Tr2 is determined by V1, R3, and R4. Thus, a voltage lower than the base level by an amount equal to the base-to-emitter voltage Vbe appears at the output VM13. This voltage VM13 is used as a field level. In FIG. 4, for example, this field level is denoted by "VM13 (field)". In the frame mode, on the other hand, the frame mode/field mode signal is switched to a high level so that the transistor Tr2 turns on. As a result, the base-emitter resistance of the transistor Tr1 becomes low and the base level of the transistor Tr2 is determined by not only V1, R3, and R4 but also Tr1 and R2. Thus, the base level of the transistor Tr2 in the frame mode becomes lower than in the field mode. As a result, the emitter level of the transistor Tr2 also becomes lower than in the field mode. This level is denoted by "VM13 (frame)" in FIG. 4.

If the DC level of VM13 is lowered in a frame mode operation as described above, the potential barrier between the photoelectric conversion part and the vertical transfer part of the CCD during photoelectric conversion (solid line) becomes higher than in the case of a field mode operation (broken line) as described in FIG. 4. Thus, in the frame mode a signal charge can be stored up to the level 2 in the photoelectric conversion part whereas the signal charge can be stored up to the level 1. This increase in the potential barrier prevents the stored charge in the photoelectric conversion part from leaking into the vertical transfer part in the frame mode operation, and thus the signal charge capacity in the frame mode becomes greater than in the field mode.

According to the present embodiment, as described above, the dynamic range of the photoelectric conversion part in a frame mode operation is expanded from that in a field mode operation so as to achieving a good balance in the saturation level between the photoelectric conversion part and the vertical transfer part in the field mode operation thereby improving the overall dynamic range of the CCD output.

EMBODIMENT 3

In the second embodiment described above, the signal level of VM13 is switched. This means that only the intermediate levels of the vertical transfer pulses V1 and V3 are switched. However, the vertical transfer efficiency depends on all relative values of the transfer pulses V1 through V4, and thus the above switching of the intermediate levels of V1 and V3 results in a reduction in the vertical transfer efficiency. In addition, as the superfluous charge flows away through the electrodes V2, V4, the dynamic range cannot be improved. The above problems are solved by the third embodiment in such a manner that when the level of VM13 is switched, levels of VM24 shown in FIGS. 8 and 9 are also switched simultaneously thereby preventing the reduction in the vertical transfer efficiency and the dynamic range.

Figure 5:
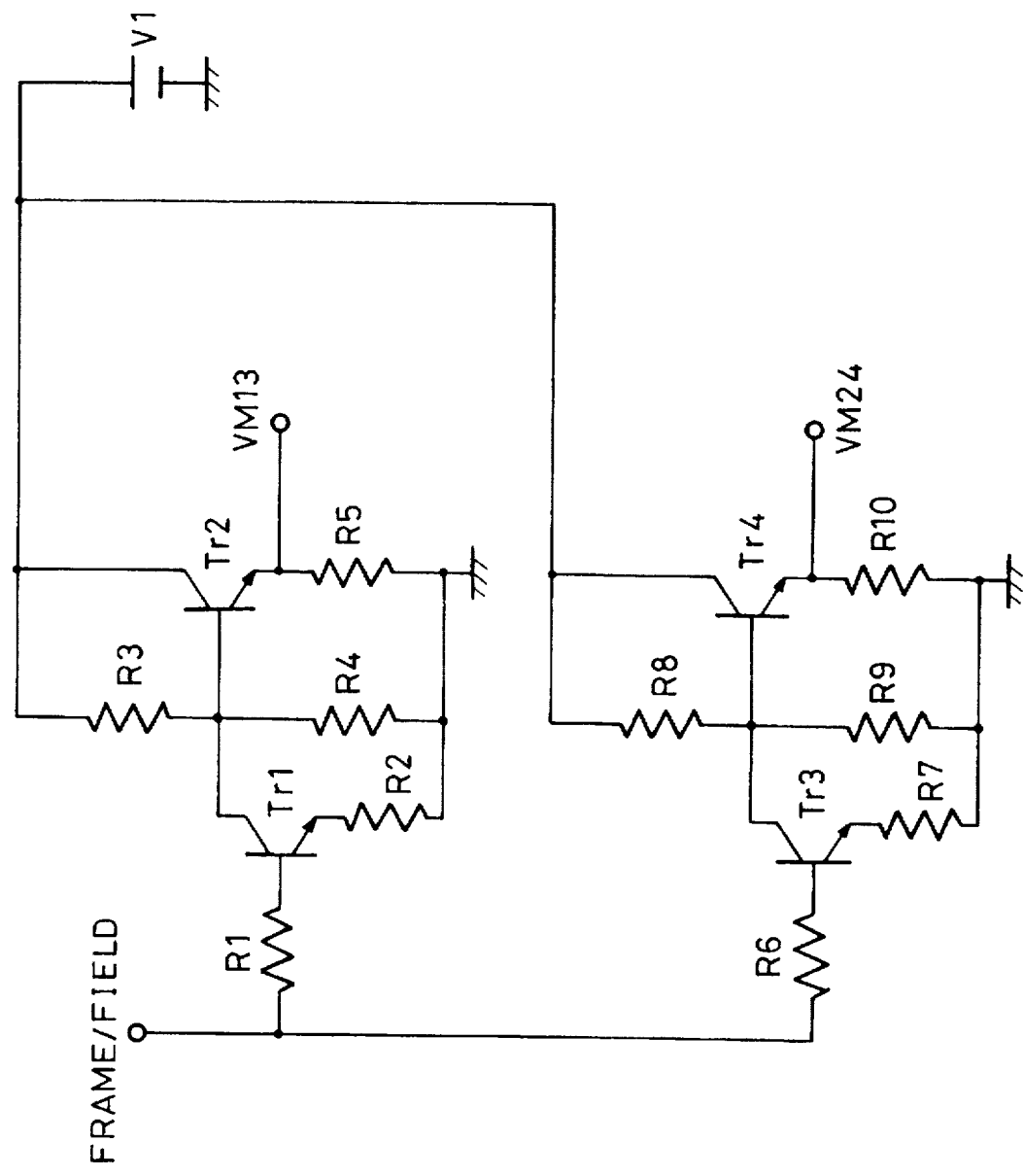
FIG. 5 is a circuit diagram relating to a third embodiment of the invention.

FIG. 5 illustrates an exemplary circuit that implements, according to the third embodiment, the driving voltage setting circuit of FIG. 1. The value of VM24 is determined by R6 through R10, Tr3, and Tr4. Then, the value of VM24 determines the vertical transfer pulses V2 and V4 that can have two levels (refer to FIG. 8 or 9).

Thus, the circuit shown in FIG. 5 leads to a reduction in VM24 nearly equal to the reduction in VM13 during a frame mode operation. As a result, the dynamic range of the photoelectric conversion part is expanded without a reduction in the vertical transfer efficiency relative to that in a field mode operation.

As shown in FIG. 5, both circuits responsible for generating VM13 and VM24, respectively, rely on a common power source V1. Furthermore, both circuits are configured in such a manner that the base-to-emitter voltage drop of only one transistor has a relation to the output voltages VM13 and VM24 so that the influence of the base-to-emitter voltage on the output voltages VM13 and VM24 is minimized wherein the base-to-emitter voltage is greatly influenced by temperature. The common use of the power source and the circuit configurations having similar temperature characteristics make it possible to prevent the reduction in the vertical transfer efficiency that would otherwise occur owing to variations in the power supply voltage and temperature.

In the example described above, only intermediate levels of VM13 and VM24 are switched. Therefore, relative values of the resulting intermediate levels to other high or low levels also changes, which can influence the driving characteristics. To avoid this problem, in an alternative embodiment, high and/or low levels may also be changed in response to the changes in VM13 and VM24.

EMBODIMENT 4

Figure 6:
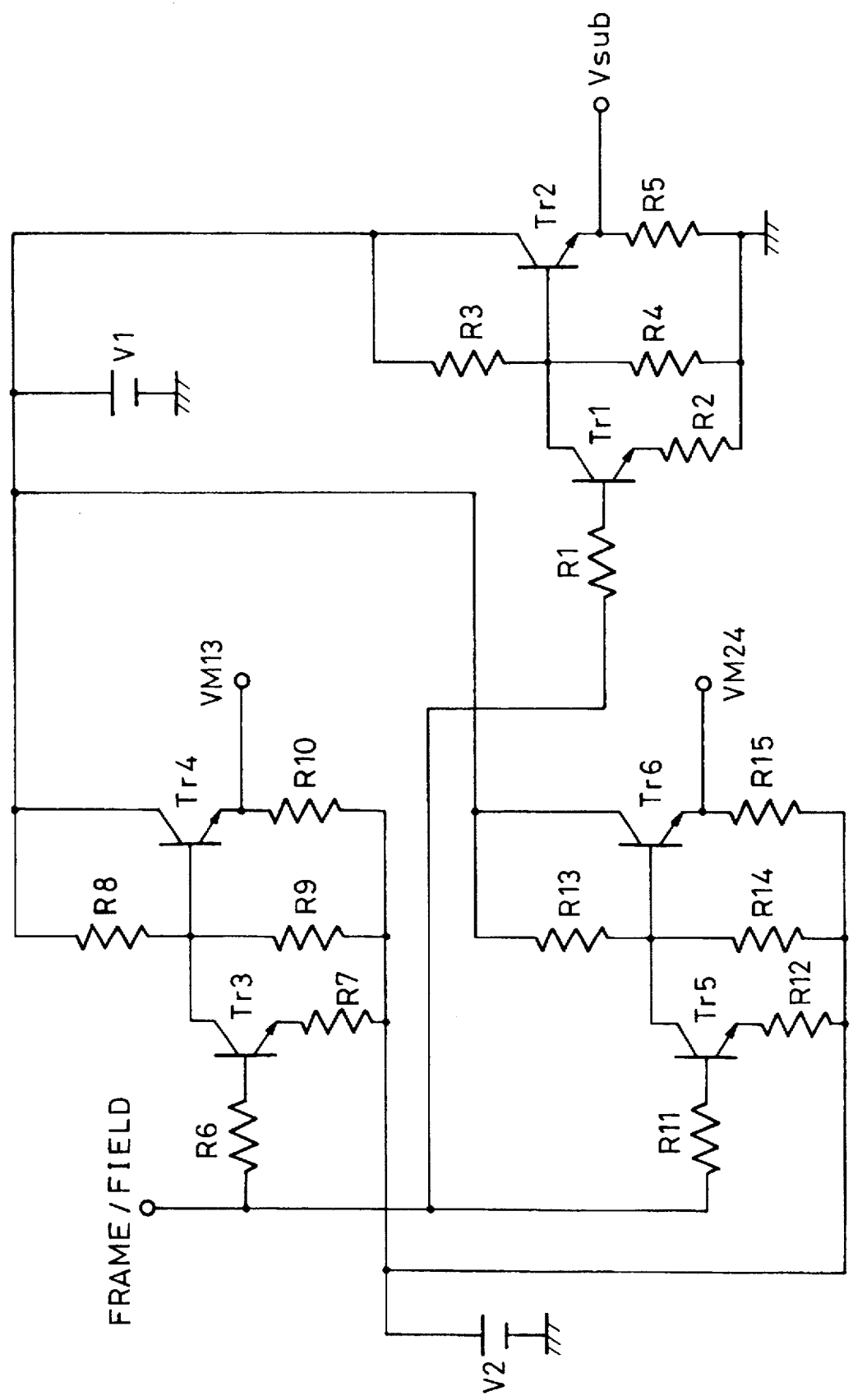
FIG. 6 is a circuit diagram relating to a fourth embodiment of the invention.

FIG. 6 illustrates a fourth embodiment of a circuit according to the present invention wherein the circuit include resistors R1 through R15, transistors Tr1 through Tr6, and reference voltage sources V1 and V2. The voltage source V2 supplies a negative reference voltage so that VM13 and VM24 can have negative levels. In this embodiment, when the reading mode is switched between the field mode and frame mode, the values of Vsub, VM13, and VM24 are all switched at the same time so that the dynamic range of the photoelectric conversion part is expanded further in a frame mode operation while maintaining a large value in the vertical transfer efficiency. Circuit blocks responsible for generating each voltage described above are connected to common voltage sources and are configured to have similar temperature characteristics so that relative values of the voltages will remain unchanged regardless of voltage source or temperature variations.

As descried above, the silicon substrate voltage, the level of the vertical transfer pulse, and the width of the vertical transfer pulse are all switched at the same time thereby expanding the dynamic range in the frame mode operation while maintaining good ability of preventing blooming, as opposed to the case of switching only the substrate voltage, which results in a reduction in the anti-blooming ability. If only the substrate voltage Vsub is changed, the potential well in the photoelectric conversion part becomes deeper and charges overflow into the vertical transfer part, which results in a mixture with charges of adjacent pixels. In this embodiment, this problem can be avoided by raising the potential barrier between the photoelectric conversion part and the vertical transfer part.

As described above, in the first embodiment of the invention, the image pick-up apparatus comprises:

an image sensing device for converting an optical image into an electrical signal, the image sensing device including a photoelectric conversion part and a vertical transfer part;

mode switching means for switching an operation mode between a frame mode and field mode; and control means for controlling the bias level of a vertical transfer pulse depending on the operation mode selected via the mode switching means;

thereby expanding the dynamic range and thus preventing relating problems such as blooming.

In particular, it is possible to expand the dynamic range of a CCD even in the frame mode to a desirable level by varying the pulse width and various setting voltages depending on the operation mode. Therefore, a high-quality general-purpose image sensing device can be achieved without adding any special expensive circuits.

According to another aspect of the present invention, the voltage applied to the substrate is also varied depending on the operation mode thereby achieving further expansion of the dynamic range and thus preventing more effectively relating problems such as blooming.

According to still another aspect of the present invention, all levels of pulses used to drive the vertical transfer part are shifted by substantially the same amount so as to expand the dynamic range without reducing the vertical transfer efficiency, and thus without degradation in picture quality.

According to a further aspect of the present invention, circuits for determining the above parameters of pulses applied to the vertical transfer part have a power source used in common by all these circuits, and furthermore all these circuits have similar temperature characteristics thereby minimizing the influence of temperature on the dynamic range and the transfer efficiency.

Furthermore, the voltage applied to the substrate of the image sensing device is also switched thereby expanding the dynamic range further and preventing problems such as blooming.

EMBODIMENT 5

Figure 10:
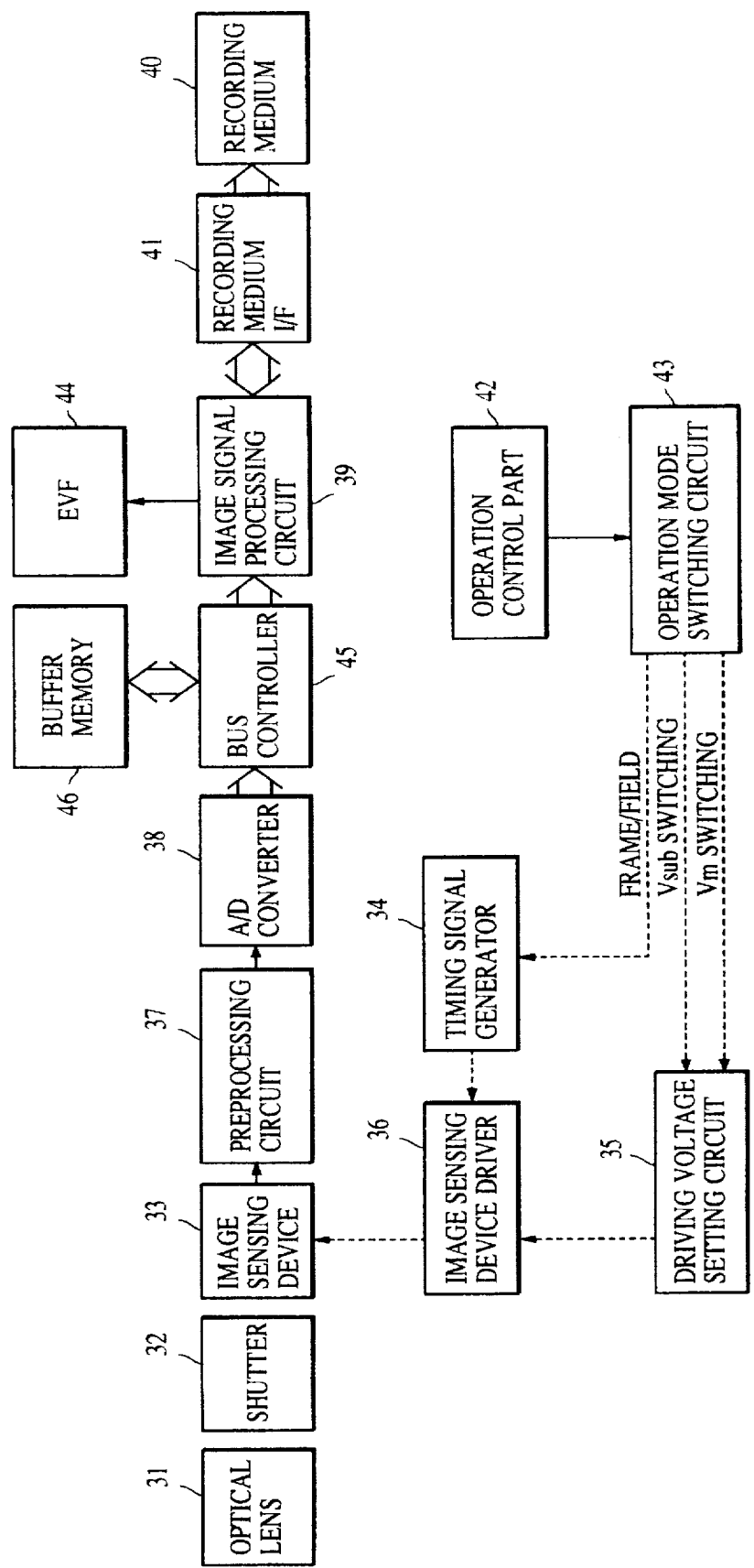
FIG. 10 is a block diagram of a digital camera.

FIG. 10 is a block diagram of a fifth embodiment of a digital camera according to the present invention.

As shown, the digital camera includes: an optical lens 31 for focusing an optical image of an object; a shutter 32 for controlling the passage of light associated with the optical image formed by the optical lens 31; an image sensing device 33, such as an interline CCD having a complementary color filter array which is widely used in movie video cameras, for converting the optical image of the object focused by the optical lens 31 into an electrical signal; a timing signal generator 34 for generating a timing signal under which the image sensing device 33 operates; a driving signal setting circuit 35 for generating voltages used to drive the image sensing device 33; an image sensing device driver 36 for amplifying the timing signal supplied by the timing signal generator 34 to a level needed to drive the image sensing device 33; a preprocessing circuit 37 including a CDS circuit and an AGC circuit; an A/D converter 38 for converting an analog signal output by the preprocessing circuit 37 to a digital signal; an image signal processing circuit 39 for processing the above digital signal; a recording medium 40 for recording the signal processed by the image signal processing circuit 39; a recording medium interface circuit 41 via which the signal is transmitted to the recording medium 40; an operation control part 42 via which a user can control camera operations such as starting of taking a picture and also can select the reading operation mode of the image sensing device 33 between a frame mode and a field mode; an operation mode switching circuit 43 that outputs a control signal for switching the driving voltage in response to the reading operation mode selected via the operation control part 42 and also outputs a signal for setting the timing conditions of the timing signal generator 34; an EVF 44 for displaying the image signal on a display unit; a bus controller 45; and a buffer memory 46 for temporarily storing the digital signal.

In this embodiment, it is assumed that the digital camera is used to take still images. In general, an image obtained by this type of camera consists of one field acquired by means of a field reading operation. Therefore, the resultant image has poor resolution much lower than the resolution the image sensing device actually has. If an interline CCD having a complementary color filter array, which is widely used in movie video cameras, is employed and operated, not in such a manner that pixel signals are added pixel by pixel, but in such a manner that a signal associated with odd-numbered lines are read in a first field period and then a signal associated with even-numbered lines are read in the subsequent field period as in the frame mode operation shown in FIG. 7 (in the following discussion, the frame reading operation shown in FIG. 7 will be referred to as a full frame reading operation or full pixel reading operation so as to avoid confusion) wherein both signals are recorded in a memory device, then it is possible to obtain an image having higher resolution by processing the signals recorded in the memory device.

However, in this full frame reading technique, the dynamic range is reduced to half. As a result, the output of the image sensing device is amplified with an AGC gain about twice that in the above-described additive field reading technique (also referred to simply as a field reading technique), which results in a great reduction in the signal-to-noise ratio of the image.

In the digital camera according to the present embodiment of the invention, the operation mode can be switched between a field reading mode and a full frame reading mode maintaining a large dynamic range in the output of the image sensing device even in the full frame reading mode. This is achieved by performing the full frame reading operation under conditions that can increase the charge storage capacity of each cell of the photoelectric conversion part whereas the field reading operation is performed under conditions similar to those employed in common movie video cameras.

Figure 11:
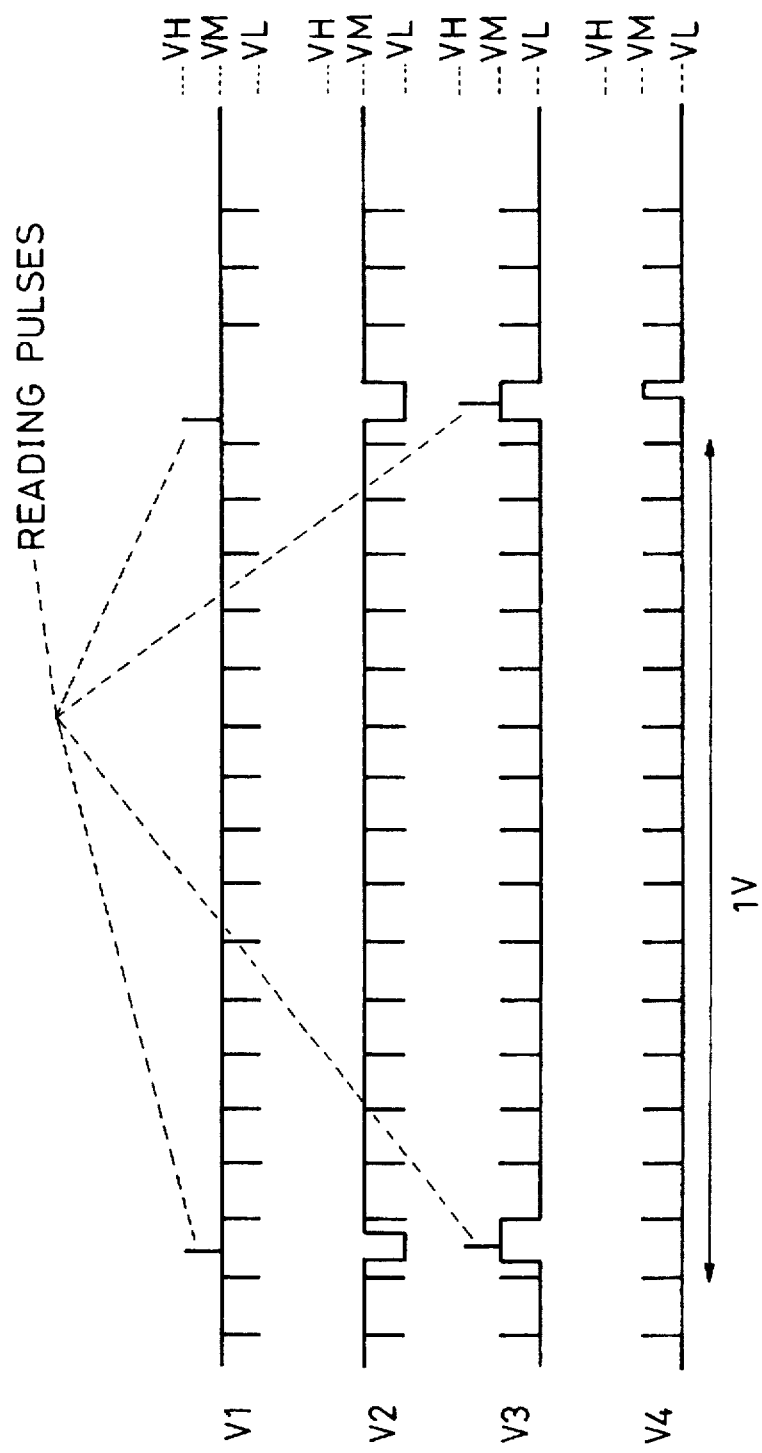
FIG. 11 is a timing chart of pulses used to drive an image sensing device.

The full frame reading operation is described below in further detail referring to FIGS. 7b, 7c, 7d, and 11, wherein FIG. 11 is a timing chart of pulses applied to four VCCDs of the image sensing device in the field reading operation.

The capacity of the photoelectric conversion cell is determined by the potential of a vertical overflow drain as well as the potential below a reading gate electrode. A potential barrier is formed in a p-layer as shown in FIG. 7c. The height of this potential barrier is determined by the bias voltage Vsub applied to the silicon substrate wherein the higher the bias voltage Vsub, the lower the potential barrier. On the other hand, the reading gate electrode is connected to one transfer electrode of the vertical transfer part (the gates V1 and V3 are the case in the example shown in FIG. 7d). A voltage Vh is applied to the gates V1 and V3 as shown in FIG. 11 thereby reading a signal charge from a photoelectric conversion cell into a position below a vertical transfer electrode, and then voltages Vm and Vl are applied to transfer the signal charge in the vertical direction wherein the value of Vm determines the minimum level of the potential barrier present below the reading gate during a charge storage period. Therefore, the lower the value of Vm, the higher the potential barrier below the reading gate during the charge storage period. This fact is effectively used in the present embodiment such that Vm as well as Vsub is lowered in the full frame reading mode relative to the values used in the field reading mode thereby increasing the saturation capacity of the photoelectric conversion cell in a frame storage operation.

Referring to FIG. 10, the operation of the digital cameral according to the present embodiment is described below.

First, a user turns on a first switch disposed on the operation control part 42 thereby starting a picture-taking operation in a view-finder mode. In response to an electronic shutter control pulse generated by the timing signal generator 34, the shutter 32 in conjunction with an iris (not shown) controls the exposure of the image sensing device thereby reading the output of the image sensing device. The output signal of the image sensing device is subjected to signal processing such as CDS and gain control processing in the preprocessing circuit 37. The gain of the gain control processing is preset to a proper value depending on the sensitivity of the image sensing device, when the digital camera is assembled. The output of the preprocessing circuit 37 is converted into a digital signal by the A/D converter 38 and then applied to the image signal processing circuit 39 via the bus controller 45. The signal processed by the image signal processing circuit 39 is then displayed on the EVF 44 so that the user can observe the image of the object to be taken.

Preferably, the operation in the view-finder mode is performed in the field reading mode so that the image signal can be read at a higher rate. In the field reading mode, the substrate voltage Vsub of the image sensing device and the intermediate level Vm of pulses applied to the vertical transfer gates are selected so that the potential is distributed in such a manner denoted by "level 1" in FIG. 7c. Vsub and Vm are preferably, but not exclusively, set to values employed in common movie video cameras.

Then the user can turn on a second switch disposed on the operation control part so as to start an operation in the full frame reading mode.

At the beginning of the exposing operation of the image sensing device in the full frame reading mode, a high voltage denoted by "level 0" in FIG. 7c is applied to the substrate of the image sensing device so that signal charges that have been accumulated in pixels are discharged into the substrate. Then, the substrate voltage Vsub and the intermediate voltage Vm of the vertical transfer pulse are changed so that the potential is distributed in such a manner denoted by "level 2" in FIG. 7c. Since the level 2 is lower than the level 1, the maximum charge that can be accumulated in each pixel in the full frame reading mode is greater than that in the field reading mode.

As described above, in the full frame reading mode, voltages Vsub and Vm are lowered (to the level 2) so as to increase the saturation capacities of photoelectric conversion cells of the image sensing device thereby increasing the saturation level of the image signal.

It should be noted here that when the voltage Vm is lowered down to the level 2 it is difficult to lower the voltages Vm of only the electrodes V1 and V3 which also act as reading gates. Isolation regions between photoelectric conversion cells and the electrodes V2 and V4 are not entirely isolated by a channel stop as shown in FIG. 7d. Therefore, it is desirable that voltages of all electrodes (V1, V2, V3, and V4) be lowered.

The technique described above is based on the assumption that the vertical transfer part (also referred to as a VCCD) has a sufficiently high saturation capacity. That is, it is assumed that, the charge of one pixel is dealt with in the full frame reading mode, unlike the field reading mode in which two pixels are added together.

Figure 12:
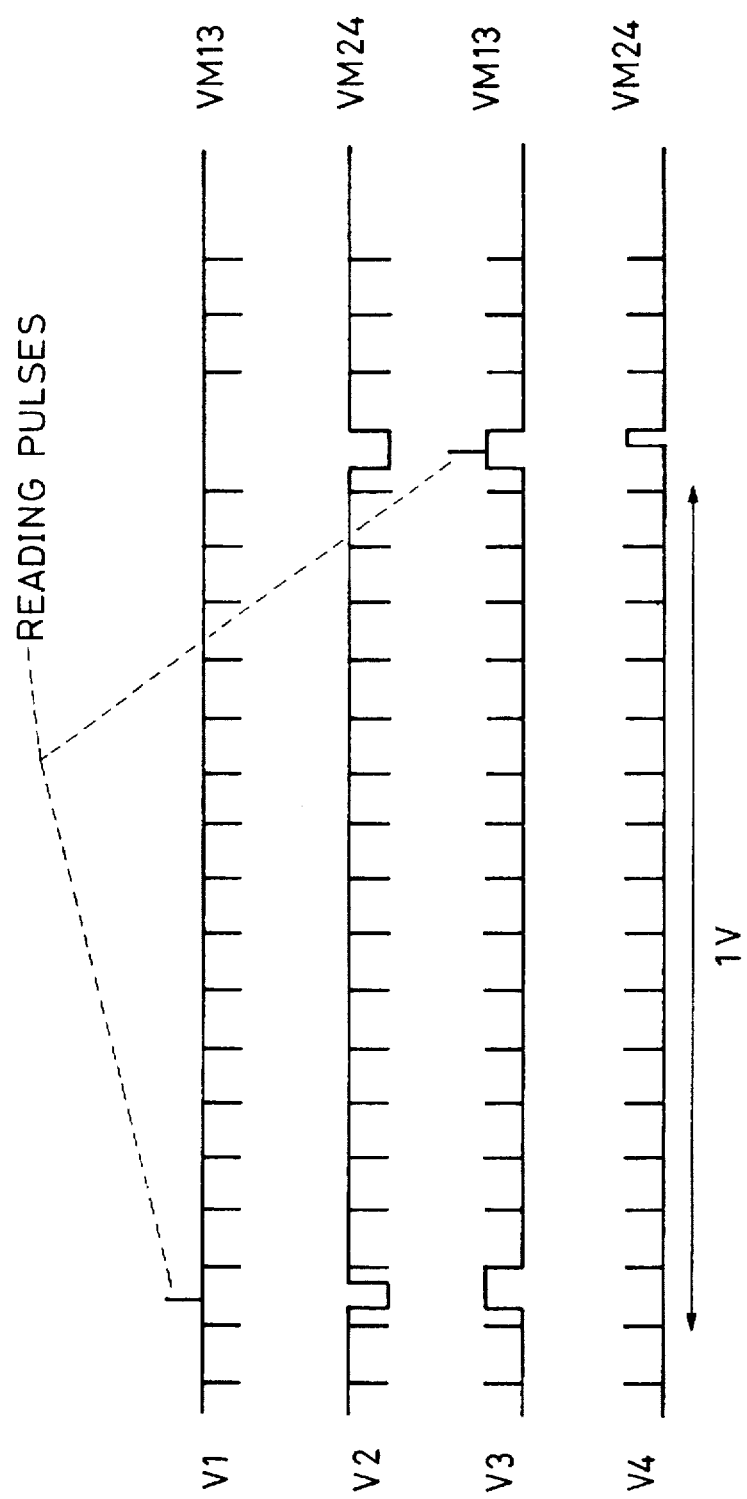
FIG. 12 is a timing chart of pulses used to drive an image sensing device.

Referring to FIG. 12, the operation will be described further. FIG. 12 is a timing chart of pulses applied to VCCDs of the image sensing device in the full frame reading mode.

If a predetermined time has elapsed after beginning the exposure in the full frame mode, the shutter is closed. Thus, the exposure in the full frame mode is started when an electronic shutter pulse with level 0 is supplied to the substrate, and complete when the mechanical shutter is closed.

Figure 7A:
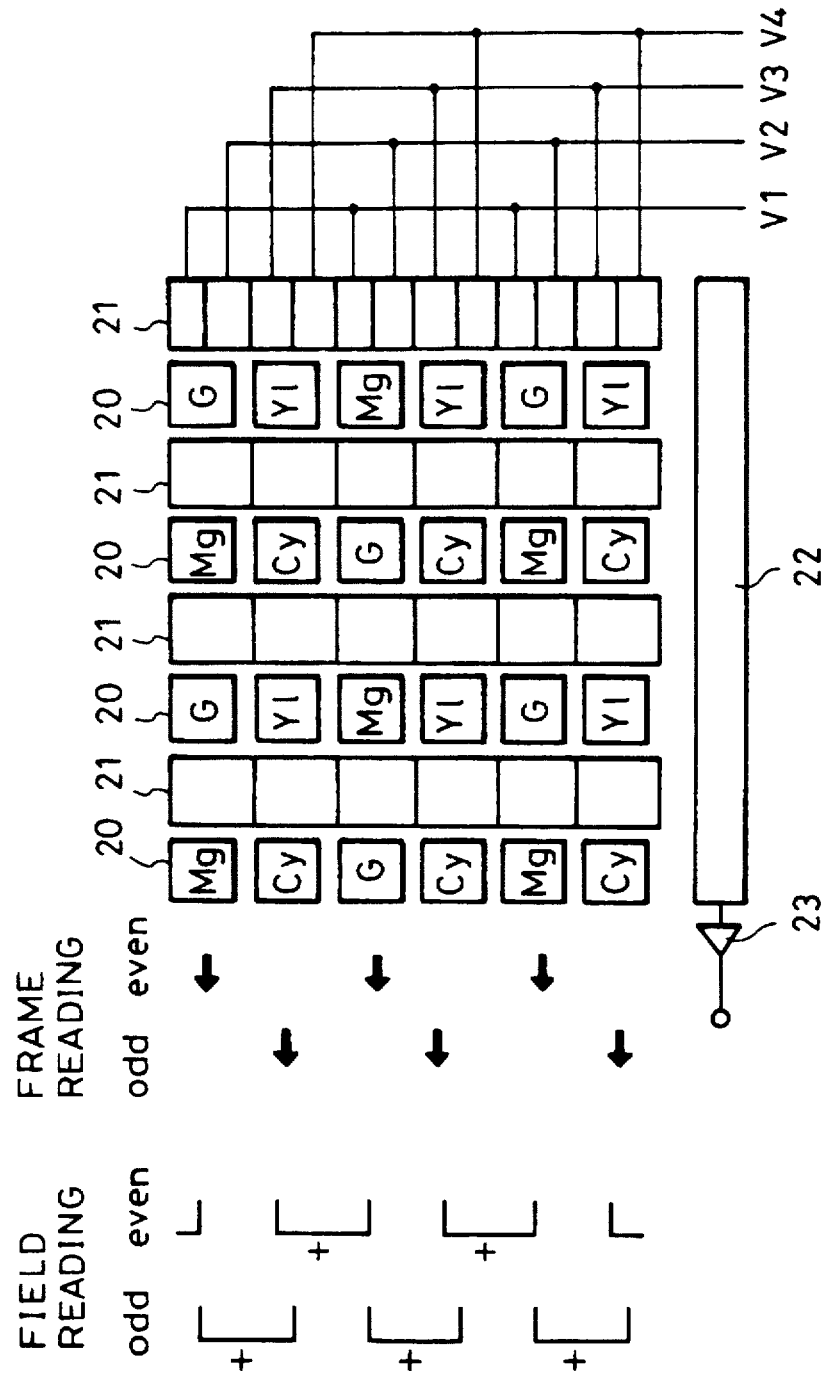
FIG. 7a is a plan view.

After closing the mechanical shutter, voltage Vh is applied for example to the gate V3 so as to read signals into vertical transfer parts from cells on lines including Cy and Ye cells of the CCD having the color filter array arranged in such a manner shown in FIG. 7a. These signals are then output successively by applying reading pulses to the electrodes V1 through V4 as shown in the timing chart of FIG. 12.

The output image signal obtained in this way is subjected to signal processing such as CDS and gain control processing in the preprocessing circuit 37. The gain control is performed with a gain equal to or slightly greater than that in the field reading mode since the image sensing device has a greater saturation voltage than in the field reading mode. The output of the preprocessing circuit 37 is applied to the A/D converter 38 and converted into a digital signal, which is then stored in the buffer memory 46 via the bus controller 45 in such a manner that one line of space or an empty line is generated in a memory map after storing one line of signal, and then the subsequent line is stored in the line next to the empty line in the memory map as shown in FIG. 13a. After reading all signals associated with odd-numbered lines of the image sensing device, signals associated with the lines including G and Mg cells are read via the gate V1. These signals are processed by the preprocessing circuit and converted into digital signals by the A/D converter. Then, the signals are stored line by line in the empty memory space of the buffer memory 46 as shown in FIG. 13b.

After writing all data into the buffer memory, the image data is read from the buffer memory according to a predetermined procedure. The image data is then processed by the image processing circuit and recorded on a recording medium 40 via the recording medium interface circuit 41.

In the electronic digital still camera of the conventional type described earlier, irregularity occurs in the output of the image sensing device when the output exceeds a certain value, which causes serious degradation in the image quality. If Vm is decreased, the above-described variations occur in a lower ranges of output voltages of the image sensing device. The variations cause a serious problem in particular in the full frame reading mode. The relationship between Vm and the range of the output voltage in which the variations occur is very dependent on variations in production parameters of the image sensing device.

The variations will be discussed in further detail below.

The saturation capacity of an interline solid-state image sensing device depends mainly on four factors described below:

1. The saturation capacity of a photoelectric conversion cell. This depends on both Vsub and Vm. In either case, a lower voltage gives a greater saturation capacity.
2. The saturation value of a VCCD. This is determined by the maximum transfer capacity. The higher Vm, the greater the saturation value of the VCCD.
3. The saturation value of a horizontal transfer part of the CDD (HCDD). This value is determined by the maximum transfer capacity of the HCDD.
4. Floating diffusion capacitance.

Of the above factors, factors 3 and 4 can be neglected because it is possible to have sufficiently high saturation values regarding these factors and these factors do not contribute to the irregularity in the output of the image sensing device. Therefore, these factors 3 and 4 will not be discussed further here.

Before discussing the remaining factors 1 and 2, the reading operation from a photoelectric conversion cell to a VCCD and the charge transfer operation of the VCCD will be discussed first.

FIGS. 14a and 14b illustrate potential profiles of VCCDs on one line at various stages of operations from a start of a reading operation from pixels to VCCDs to completion of a subsequent charge transfer operation of the first one line of VCCDs according to the conventional field reading technique.

FIG. 15 is a timing chart of pulses which are applied to electrodes of respective VCCDs to read signals from photoelectric conversion cells to VCCDs in an interlace fashion according to the conventional field reading technique employed in common movie video cameras, wherein pulses for both first and second fields are illustrated.

In the digital still camera, it is required to perform reading for only either one of the first and second fields. In FIG. 14 representing the potential profiles at various times of the operation, it is assumed that the VCCDs are driven by the pulses on the first-field timing basis. (There is no essential difference between the first and second fields except that addition is performed for different pixels. The difference in the manner of addition will be apparent from the following description of an adding process in the full frame reading mode.)

Figure 16:
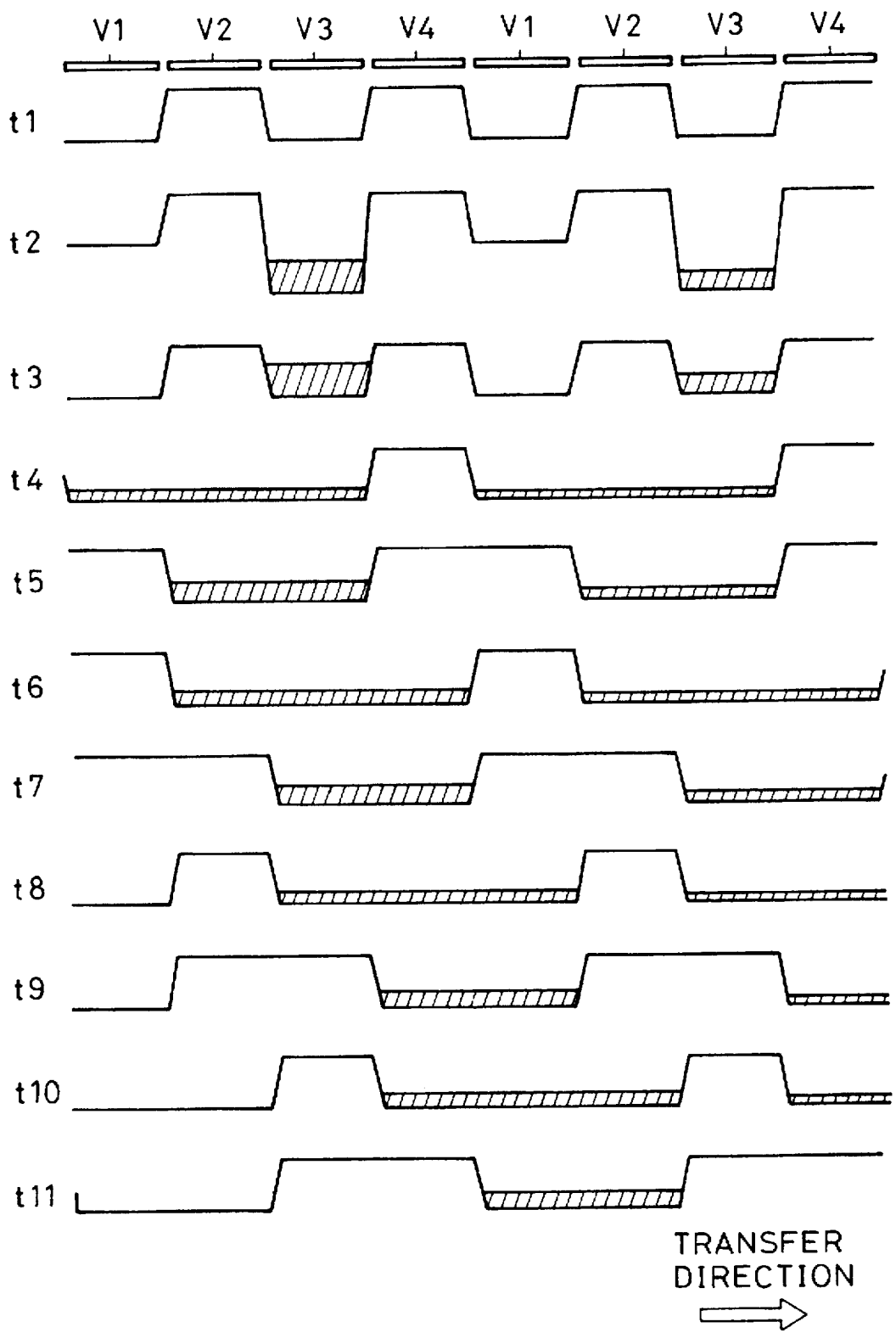
FIG. 16 is a schematic representation of potential profiles of a conventional image sensing device.
Figure 17:
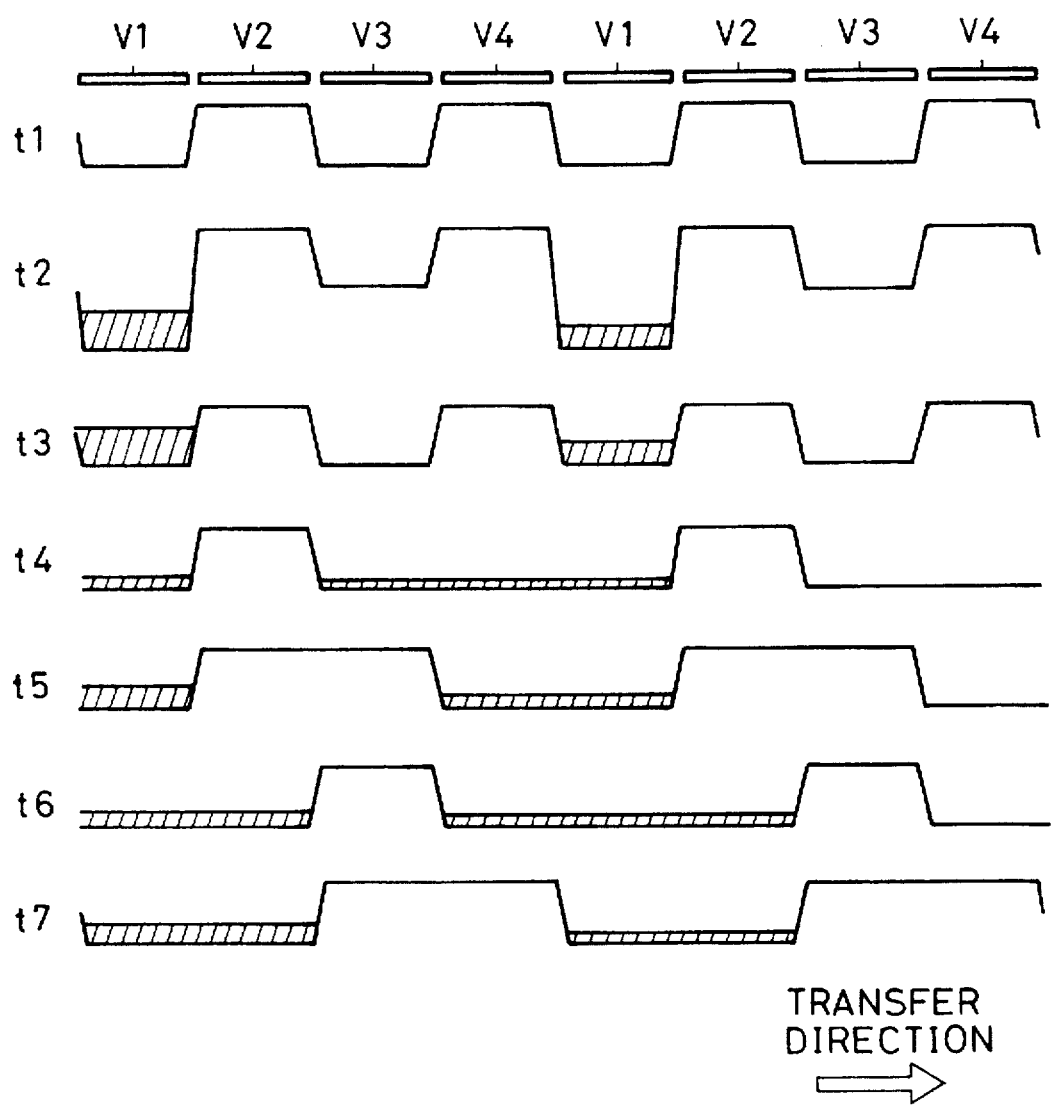
FIG. 17 is a schematic representation of potential profiles of a conventional image sensing device.

FIG. 16 illustrates potential profiles in a first-field reading operation according to the full frame reading technique, whereas potential profiles in a second-field reading operation are illustrated in FIG. 17. In these figures, potential profiles of VCCDs at various operation stages from a start of reading from conventional photoelectric conversion cells to VCCDs to completion of a subsequent charge transfer operation of the first VCCD.

Figure 18:
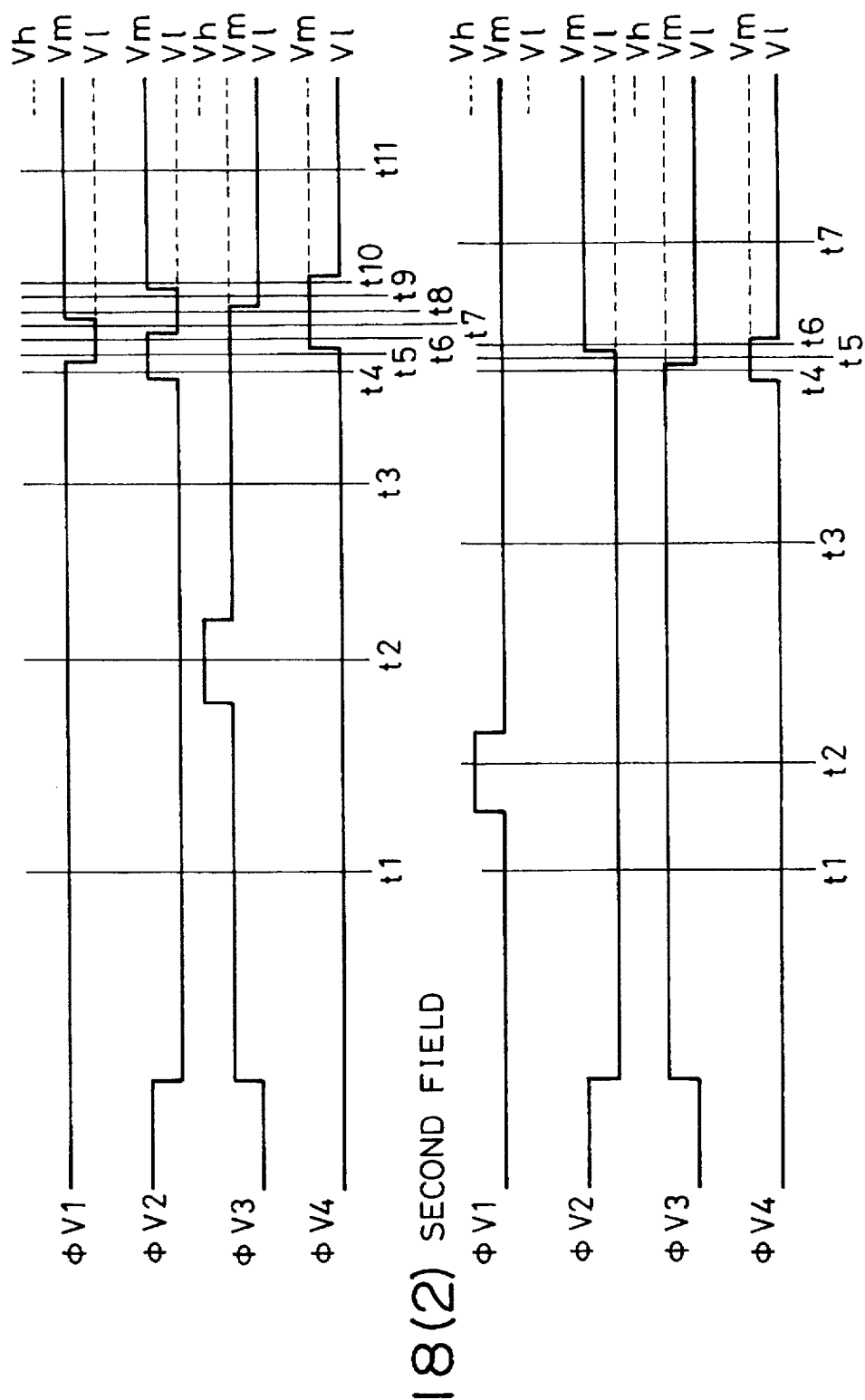
FIG. 18 is a timing chart of pulses used in a conventional technique.

FIG. 18(1) is a timing chart relating to the first-field reading operation from conventional photoelectric conversion cells to VCCDs according to the full frame reading technique, whereas a timing chart relating to the second-field reading operation is given in FIG. 18(2).

As can be seen from these figures, the maximum charge transfer capacity of VCCDs is determined by the maximum charge storage capacity at a time when surface areas of the semiconductor under two electrodes of four electrodes are depleted.

On the other hand, the maximum charge storage capacity of a photoelectric conversion cell is determined by the potential of the vertical overflow drain of the photoelectric conversion cell shown in FIG. 7b or 7c (that is, the height of the barrier formed in the p-layer shown in FIG. 7b or 7c) and the potential below the reading gate electrode (that is, the height of the barrier formed between the VCCD and a PD or a pixel). The potential barrier formed at a certain depth of the silicon substrate depends on a bias voltage applied to the silicon substrate wherein the greater the bias voltage Vsub, the lower the potential barrier. The reading gate electrode is connected to one transfer electrode of the vertical transfer part (the gates V1 and V3 are the case in the example shown in FIG. 7d). When reading a signal charge from a photoelectric conversion cell into a position below a vertical transfer electrode, a voltage Vh is applied to the gates V1 and V3 as shown in FIG. 18. Then voltages Vm and Vl are applied to the gates V1 and V3 so as to transfer the signal charge in the vertical direction wherein the value of Vm determines the minimum level of the potential barrier below the reading gate during a charge storage period. Therefore, the lower the value of Vm, the higher the potential barrier below the reading gate during the charge storage period.

In common image sensing devices, the voltages Vh, Vm, and Vl of these vertical driving pulses are set to predetermined fixed values.

These voltages cannot be set to arbitrary values other than the predetermined values whereas these voltages may vary in allowable small ranges.

The substrate voltage Vsub is set to a proper value so that the potential barrier formed at the depth of the substrate is lower than the potential barrier formed below the reading gate wherein the potential barrier below the reading gate is determined by the value of Vm. This is achieved by adjusting the substrate voltage Vsub so that no charge leaks from photoelectric conversion cells to VCCDs when the image sensing device is illuminated by strong light that produces an output about 100 times greater than a normal output.

The saturation charge capacity of the photoelectric conversion cell and the saturation charge transfer capacity of the VCCD can be determined in the above-described manner. It should be noted here that the saturation charge capacity of the photoelectric conversion cell should be greater than the saturation charge transfer capacity of the VCCD, otherwise excess charges will overflow into other portions adjacent to the transfer path, and thus blooming will occur. Therefore, it is required to further adjust the substrate voltage Vsub so that blooming does not occur under the above-described illumination condition.

The above-described method is widely employed to adjust the substrate voltage Vsub. When an image sensing device is driven by voltages determined according to the above adjustment method, the maximum charge that can be extracted at the output of the image sensing device without practical problems will be discussed below. If the substrate voltage Vsub is determined according to the above-described adjustment procedure, the storage capacity of the photoelectric conversion cell is set to the maximum saturation value. However, this value is not equal to the maximum charge transfer capacity of VCCDs as will be discussed below.

In the following discussion, FIGS. 16 and 17 illustrating the potential profiles in the full frame reading mode, FIG. 18 illustrating the timing chart in the full frame reading mode, FIG. 14 illustrating the potential profiles in the field reading mode, FIG. 15 illustrating the timing chart in the field reading mode will be referred again.

In these figures, signal charges are read from photoelectric conversion cells to VCCDs during a time period from t1 to t4.

At the time (t1) immediately before starting the reading of the signal charges from the photoelectric conversion cells, odd-numbered VCCD cells (below V1 and V3), which also serve as reading gates, are in a depleted state (in which there is formed a potential well held at a high potential, and the gate electrode is at a voltage Vm), and even-numbered cells (below V2 and V4) acting as charge transfer elements are in an inverted state (in which there is formed a potential barrier held at a low potential, and the gate electrodes are at a voltage Vl). Then at t2, a voltage Vh is applied to the first electrode V1 or the third electrode V3 of the charge transfer elements acting also as reading gates so that the signal charge of the photoelectric conversion cell adjacent to the first VCCD cell or the third VCCD cell is read into the corresponding VCCD cell.

After the completion of the reading operation (at t3), the state becomes the same as that at t1, and this state is kept for a certain time period. If the operation is in the field reading mode, a pulse is applied to the other electrode which did not deal with the previous reading operation so that the signal charge of the photoelectric conversion cell adjacent to the VCCD cell is read into this VCCD cell as in the previous reading operation (at t2', t3').

After a short time has elapsed since the completion of the signal charge transfer operation from each pixel into the adjacent charge transfer cell, the voltage applied to the second or fourth electrode is switched from Vl to Vm so as to lower the potential barrier formed below the second or fourth electrode, thereby eliminating the potential barrier blocking the charges stored in the adjacent charge transfer cells.

As a result, a charge storage space is formed by three successive charge transfer cells. In the case of the field reading mode, signal charges of two photoelectric conversion cells are mixed together in this charge storage space. In the above process to lower the potential barrier at t4 (refer to FIG. 14a), the gate below the second electrode and the gate below the fourth electrode are alternately opened so as to achieve a quasi interlace operation with the first and second fields.

Then at t5 and after that, signal charges are transferred horizontally line by line to the HCDD thereby reading the signal charges successively.

In the earlier discussion, it has been stated that the saturation level of the image sensing device is determined by the maximum charge transfer capacity of VCCDs or the maximum charge that can be stored when two adjacent charge transfer cells of VCCDs are depleted. More specifically, the above statement implies that the saturation level of the image sensing device is determined by the maximum charge that can be stored when both first and third cells are depleted.

The saturation level will be discussed in further detail below. In the field reading mode, the above maximum charge that can be stored is equal to the sum of the maximum storage charges of the first and second cells which depend on Vm. In the full frame reading mode, on the other hand, the maximum charge that can be stored is equal to the maximum storage charge of the first cell or the second cell.

It should be noted here that the sum of the maximum storage capacities of the first and third cells obtained at the time t3' (refer to FIG. 14a) is not equal to the maximum storage capacity obtained when both first and second cells are depleted at the time t4. In general, the storage capacity in the latter case is greater than in the former case.

Let's assume that a signal charge is read into a charge transfer cell at time t3 and this cell is filled up to its upper limit with the charge. The maximum charge that can be stored in this cell is determined by the height of the potential barrier formed by the second or fourth cell. A problem here is that the height of the potential barrier varies from one cell to another. Furthermore, in the case of an area sensor, since the vertical transfer gates are connected via long and thin wires in an aluminum interconnection layer, the voltages applied to the electrodes of the vertical transfer gates vary from one gate to another across the image area. Just after completion of the application of a pulse having a voltage of Vh to the electrode of a cell to be read, that is, just after the voltage applied to the electrode of the cell has been changed from Vh to Vm, the potential of the semiconductor surface is in the middle of transition from the potential profile at t1 to that at t2. After that, if the voltage conditions at t3 are maintained, the potential profile approaches a stable state such as that denoted by "t3" in FIG. 14a. However, since there are variations in barrier height, that is, there is difference in the barrier height between the second cell and the fourth cell, a part of the charge flows into an adjacent charge transfer cell that is completely depleted or into an adjacent charge transfer cell that does not reach a saturated state yet. In the above process, it takes about a few hundred nsec to reach the final stable state, in which flowing of a charge into a potential well of an adjacent charge transfer cell no longer occurs, since the transition from Vh to Vm due to the application of a reading pulse.

If the value of Vm is reduced, the maximum storage charges of charge transfer cells become smaller, whereas the variations in potential barriers remain unchanged. As a result, the onset of irregularity in the output occurs at a lower output voltage, and furthermore, the magnitude of the irregularity becomes greater. This is a mechanism of the irregularity in the output described earlier. Therefore, it is impossible to reduce the irregularity by reducing the values of Vsub and Vm to increase the maximum storage capacity of photoelectric conversion cells, because the reduction in Vm causes a reduction in the maximum charge capacity per cell of the charge transfer elements, and thus causing a greater irregularity in the output.

A simple technique for suppressing the irregularity is to make the saturation charges of photoelectric conversion cells sufficiently smaller than the maximum charge storage capacities of charge transfer cells that also act as reading gates. However, in this technique, it is impossible to achieve the above-described objects of the present invention. That is, it is impossible to increase the output saturation voltage in the full frame reading mode by reducing the values of Vsub and Vm thereby increasing the maximum charge storage capacities of photoelectric conversion cells. On the contrary, this technique causes a reduction in the output saturation voltage. Furthermore even in a normal field reading mode, since the saturation output of the image sensing device is determined by the minimum value of the maximum charge storage capacities of charge transfer cells that also act as reading gates, the saturation charge and thus the saturation output of the image sensing device becomes rather smaller than the maximum driving capacity of the VCCD.

EMBODIMENT 6

Figure 20:
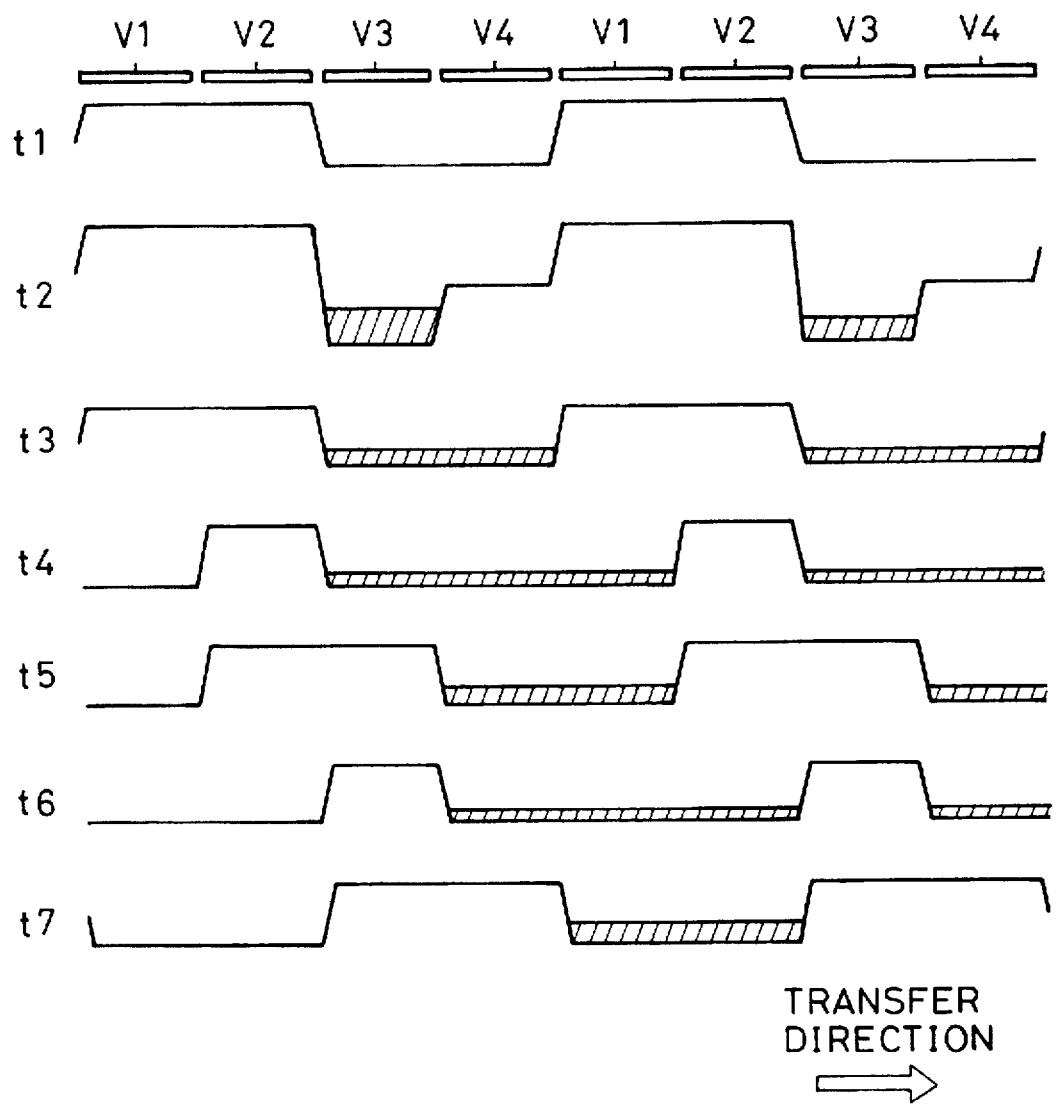
FIG. 20 is a schematic representation of potential profiles of an image sensing device according to the sixth embodiment of the invention.
Figure 21:
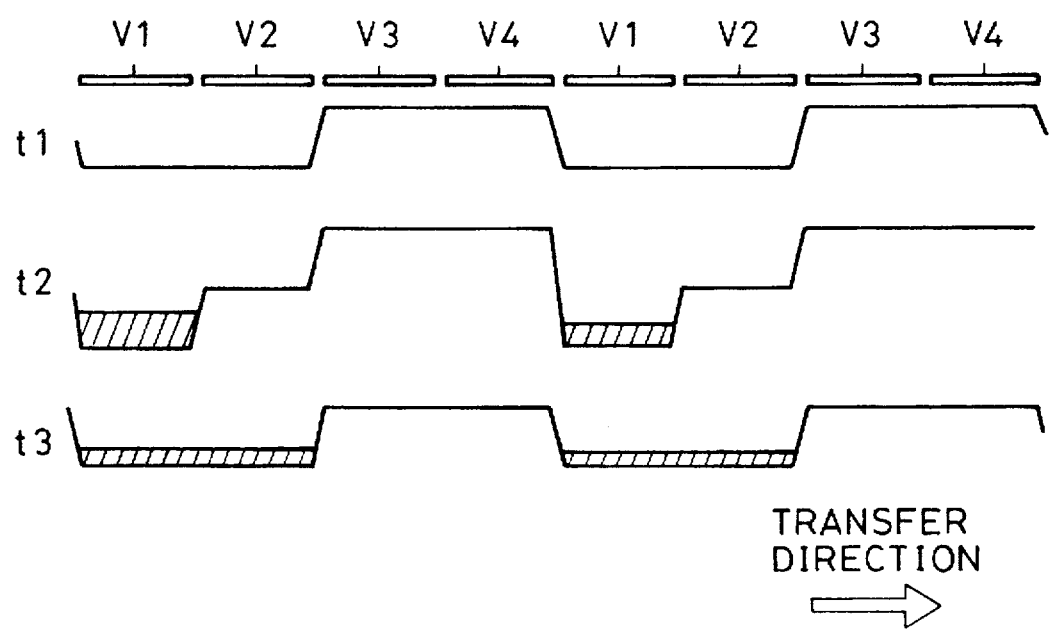
FIG. 21 is a schematic representation of potential profiles of the image sensing device according to the sixth embodiment of the invention.

Now, referring to FIGS. 19-21, a sixth embodiment of the invention will be described below, in which the above-described problems are solved.

Figure 19:
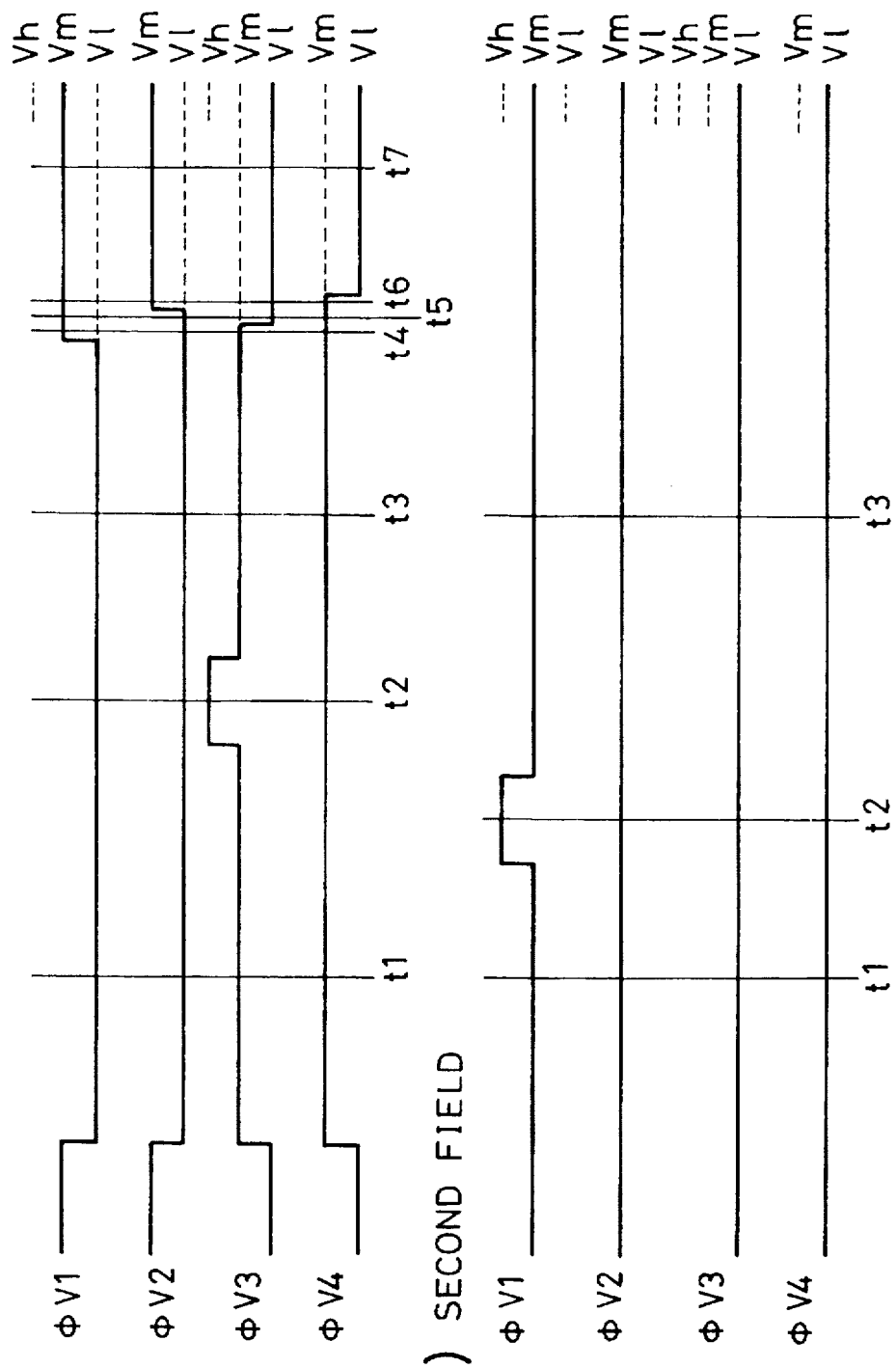
FIG. 19 is a timing chart of pulses used in a sixth embodiment of the invention.

FIG. 19 is a timing chart of pulses applied to various gates during an operation of reading a signal charge from a photoelectric conversion cell into a VCCD in the full frame reading mode, wherein FIG. 19(1) is a timing chart relating to a first-field reading operation, and FIG. 19(2) is a timing chart relating to a second-field reading operation. FIG. 20 illustrates potential profiles corresponding to FIG. 19(1), and FIG. 21 illustrates potential profiles corresponding to FIG. 19(2).

In the first-field reading operation, signal charges of lines including Cy and Ye cells are read first. At t1 before starting the reading operation, a low-level voltage Vl is applied to first gate electrodes (V1) and second gate electrodes (V2), while an intermediate-level voltage Vm is applied to third gate electrodes (V3) and fourth gate electrodes (V4). In this situation, a potential well is formed in the semiconductor surface region under the electrodes V3 and V4, and a potential barrier is formed in the semiconductor surface region under the electrodes V1 and V2. Each potential well formed in this way has a capacity equal to the sum of capacities of two charge transfer cells.

To transfer signal charges stored in Cy (cyan) and Ye (yellow) photoelectric conversion cells into VCCDs, a high-level voltage is applied to the electrodes V3 acting also as reading gates disposed adjacent to the Cy and Ye cells so as to raise the potential under the electrodes V3 thereby transferring the signal charges of the Cy and Ye photoelectric conversion cells into the semiconductor surface regions under the electrodes V3 (at t2).

After completion of the transfer of signal charges from photoelectric conversion cells to regions under the electrodes V3, the voltage applied to the electrodes V3 is changed to Vm so that the signal charges are stored in the respective potential wells formed under the electrodes V3 and V4 (at t3). This state is held for a while, and then a transfer operation is performed along a first one line of VCCDs (from t4 to t7).

In the second-field reading operation, charge signals are read into two charge transfer cells in a similar manner to the first-field reading operation. However, in this case, different electrodes are driven so that signal charges of G (green) and Mg (magenta) photoelectric conversion cells are read into regions under the electrodes V1 and V2.

In this reading technique, in contrast to the conventional reading technique in which the saturation capacity of the image sensing device is limited to the capacity of one charge transfer cell, the saturation capacity of the image sensing device is expanded up to a value equal to the sum of capacities of two charge transfer cells. In the conventional technique, as described earlier, the voltage Vsub of the substrate of the image sensing device is adjusted such that it becomes sufficiently lower than the saturation charge capacity of one photoelectric conversion cell. On the other hand, in the technique according to the present embodiment of the invention, the substrate voltage Vsub can be reduced to a lower level as long as no excess charge flows into VCCDs, thereby increasing the saturation charges of photoelectric conversion cells.

If the saturation charge of one photoelectric conversion cell is smaller than the maximum charge transfer capacity (equal to the capacity of one potential well formed by two charge transfer cells), Vm is reduced so as to increase the height of the potential barrier of each reading gate, and the substrate voltage Vsub is also reduced so as to increase the potential barrier formed at a depth in the substrate so that the saturation charge capacity of the image sensing device is increased further. However, the above reduction of Vm should be within a limit so that the charge transfer efficiency is maintained at a sufficiently high value.

In the example described above, the signal charges are stored first in the combination of V1 and V2 and that of V3 and V4. Alternative, the combination of V1 and V4 and that of V2 and V3 may also be employed. In this case, the pulses should be applied to the respective electrodes at t4 and later in a proper way corresponding to the combinations.

According to the sixth embodiment described above, the ˙saturation charge capacity and thus the saturation output of the image sensing device in the full frame reading mode can be greatly increased. In the conventional technique, the saturation output in the full frame reading mode is as small as half that in the field reading mode, and thus the output must be amplified with a greater gain than in the field reading mode, which results in a reduction in the signal-to-noise ratio. In contrast, the present invention can provide as high a signal-to-noise ratio in the full frame reading mode as in the field reading mode. Thus, in the video camera according to the present invention, it is possible to obtain a high-quality image regardless of whether the operation is performed in the field reading mode or in the full frame reading mode. In the above discussion, it is assumed that the present invention is applied to still video cameras. However, as a matter of course, the present invention can also be applied to movie video cameras.

The present invention is useful especially in the full frame reading mode, since a high saturation charge capacity is desirable in this reading mode. However, the present invention is also useful even in systems which operate only in a normal field reading mode, since the saturation charge of each pixel becomes greater and thus the systems can have a greater dynamic range.

EMBODIMENT 7

Figure 22:
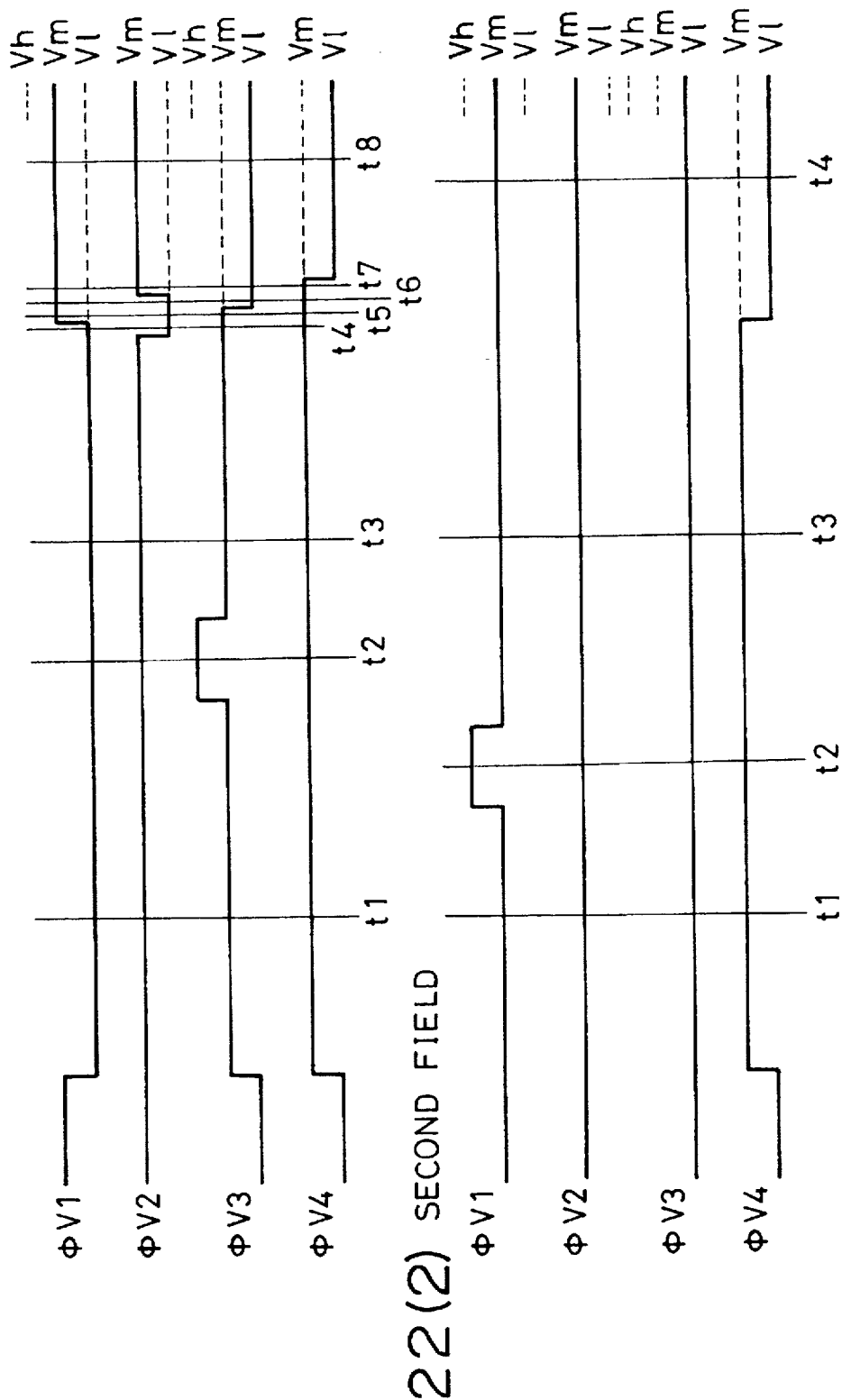
FIG. 22 is a timing chart of pulses used in a seventh embodiment of the invention.
Figure 23:
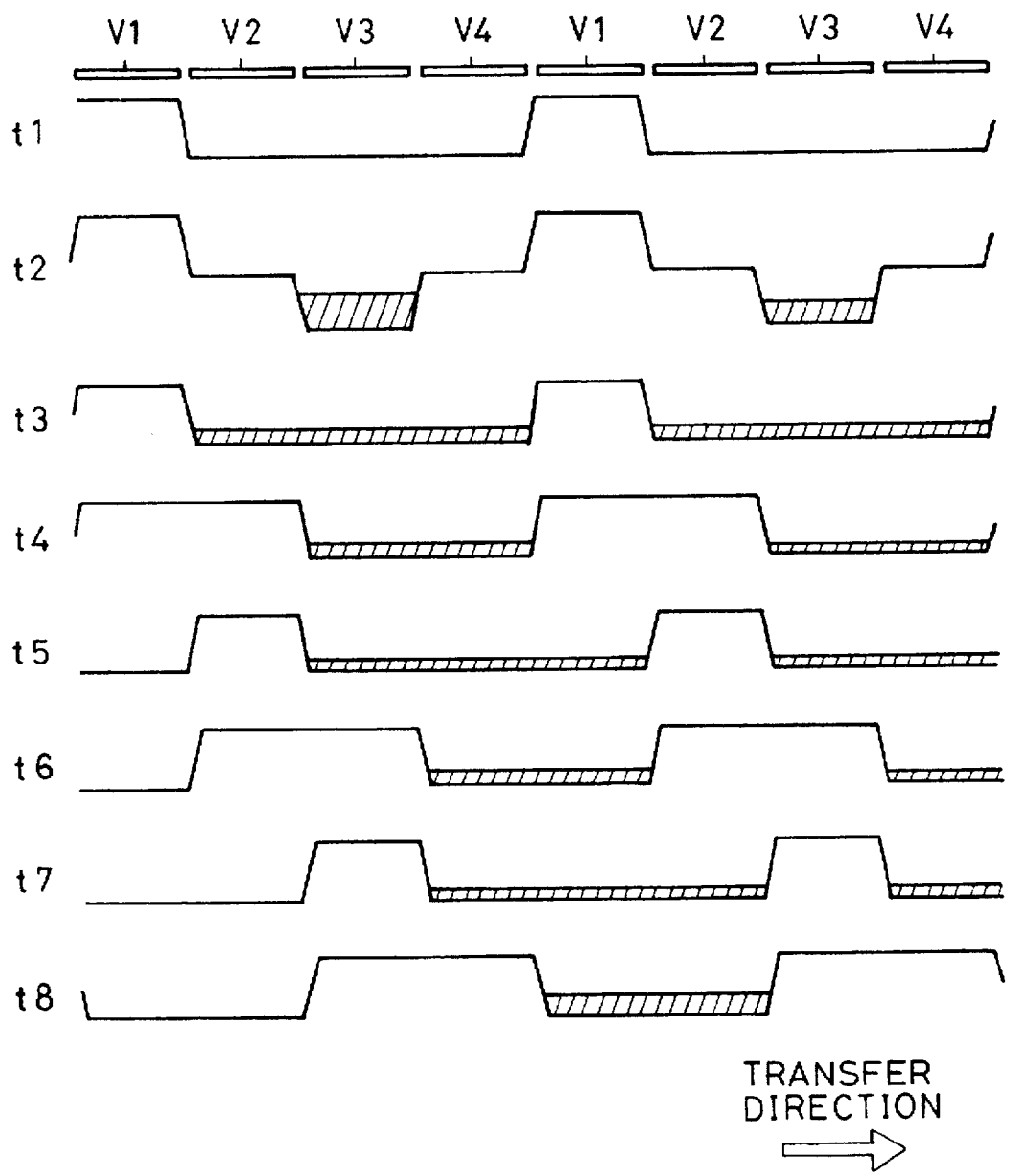
FIG. 23 is a schematic representation of potential profiles of an image sensing device according to the seventh embodiment of the invention.
Figure 24:
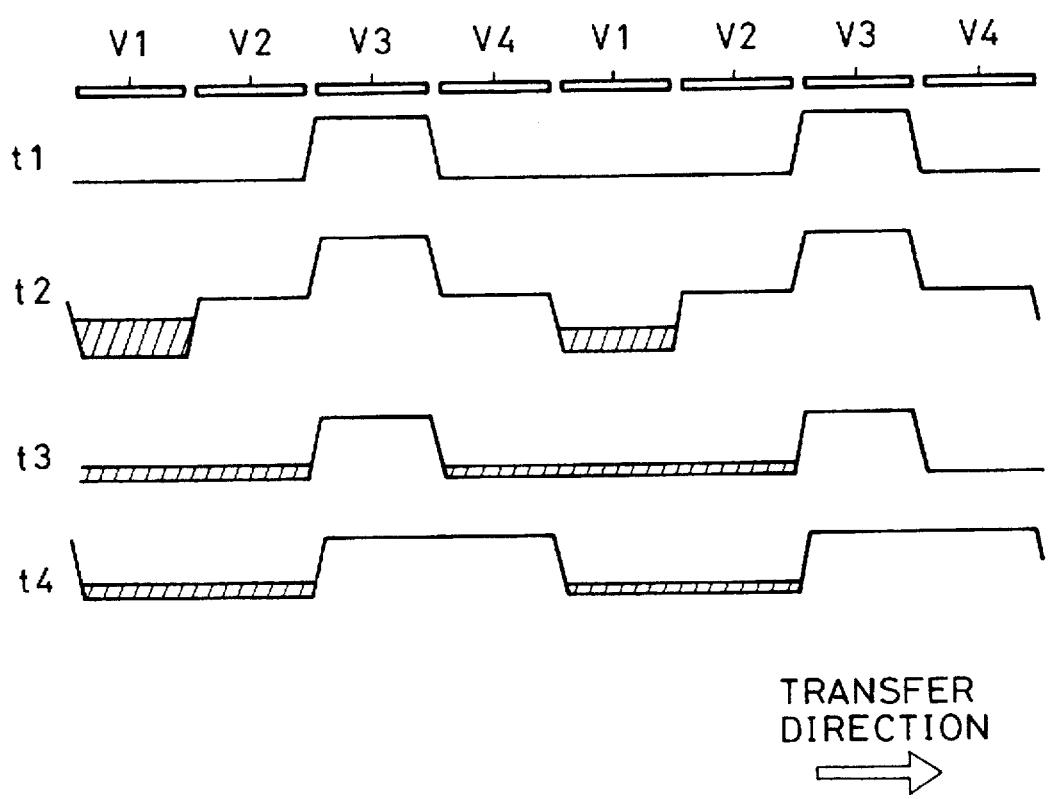
FIG. 24 is a schematic representation of potential profiles of the image sensing device according to the seventh embodiment of the invention.

Referring to FIGS. 22–24, a seventh embodiment is described below. FIG. 22 is a timing chart of pulses applied to various gates during an operation of reading a signal charge from a photoelectric conversion cell into a VCCD in the full frame reading mode, wherein FIG. 22(1) is a timing chart relating to a first-field reading operation, and FIG. 22(2) is a timing chart relating to a second-field reading operation. FIG. 23 illustrates potential profiles corresponding to FIG. 22(1), and FIG. 24 illustrates potential profiles corresponding to FIG. 22(2).

In the first-field reading operation, signal charges of lines including Cy and Ye cells are read first. At t1 before starting the reading operation, a voltage V1 is applied to electrodes V1, and a voltage Vm is applied to electrodes V2, V3, and V4 so that a potential barrier is formed in the semiconductor surface region under each electrode V1 and a potential well is formed in the semiconductor surface region under each set of electrodes V2, V3, and V4. Each potential well formed in this way has a capacity equal to the sum of capacities of three charge transfer cells.

To read signal charges stored in Cy and Ye photoelectric conversion cells, a high-level voltage is applied to the electrodes V3 acting also as reading gates disposed adjacent to the Cy and Ye cells so as to raise the potential under the electrodes V3 thereby transferring the signal charges of the Cy and Ye photoelectric conversion cells into the semiconductor surface regions under the electrodes V3 (at t2). After completion of the transfer of the signal charge from the photoelectric conversion cell to the region under the electrode V3, the voltage applied to the electrode V3 is changed to Vm so that the signal charges are stored in the respective potential wells formed under the sets of electrodes V2, V3 and V4 (at t3). This state is held for a while, and then a transfer operation is performed along a first one line of VCCDs (from t4 to t8).

In the second-field reading operation, charge signals are read into three charge transfer cells in a similar manner to the first-field reading operation. However, in this case, different electrodes are driven so that signal charges of G and Mg photoelectric conversion cells are read into regions under the electrodes V1, V2 and V3.

In this technique, the saturation capacity of the image sensing device is expanded up to a value equal to the sum of capacities of two charge transfer cells (the maximum charge transfer capacity of VCCDs) as in the sixth embodiment described above.

In the example described above, the signal charge that is read via V1 is stored in the combination of V1, V2, and V4, and the signal charge that is read via V3 is stored in the combination of V2, V2, and V4. Alternative, the combination of V1, V2, and V3 for the signal charge read via V1, and the combination of V1, V3, and V4 for the signal charge read via V3, or otherwise the combination of V1, V3, and V4 for the signal charge read via V1, and the combination of V1, V2, and V3 for the signal charge read via V3, may also be employed. In this case, the pulses should be applied to the respective electrodes at t4 and later in a proper way corresponding to the combinations.

EMBODIMENT 8

Referring to FIGS. 25, 16, and 17, an eighth embodiment of the invention is described below.

FIG. 25 is a timing chart of pulses applied to various gates during an operation of reading a signal charge from a photoelectric conversion cell into a VCCD in the full frame reading mode according to the eighth embodiment, wherein FIG. 25(1) is a timing chart relating to a first-field reading operation, and FIG. 25(2) is a timing chart relating to a second-field reading operation. In this embodiment, the potential profiles are the same as in the conventional technique described earlier. More specifically, the potential profiles corresponding to FIG. 25(1) are the same as those in shown in FIG. 16, and the potential profiles corresponding to FIG. 25(2) are the same as those in shown in FIG. 17.

The difference between the present embodiment and the conventional technique shown in FIG. 18 is that the state at t3 in the conventional technique is held for a very short time period tw in the present embodiment.

In the earlier discussion regarding the conventional technique, it has been stated that if a signal charge stored in a charge transfer cell has an amount near its saturation charge capacity during the time period tw, an excess charge flows into adjacent unsaturated potential wells. The flowing of excess charge occurs a few hundred nsec later since the end of the reading pulse used to read the signal charge from the photoelectric conversion cell to the VCDD. This means that no excess charge flows into a preceding or subsequent stage as long as the time period tw is less than the critical value or a few hundred nsec.

If the time period tw is set to a value less than that critical value, then the potential state during this time period tw is in the middle of transition from the potential profile at t2 to that at t3 represented in FIG. 16 or 17. Therefore, if a potential well is formed by successive two or three charge transfer cells during the above transition time period, it is possible to obtain a charge storage capacity greater than the capacity obtained by one cell thereby eliminating the irregularity that would otherwise occur in the range greater than a certain output level.

As can be seen from the above discussion, it is desirable that the time period tw should be as short as possible to achieve better effects.

In the above example, one potential well is formed by three charge transfer cells immediately after signal charges have been read from a photoelectric cell into VCDDs in response to the reading pulse. Alternatively, the potential well may also be formed by two charge transfer cells.

According to the present embodiment described above, it is possible to achieve a great increase in the saturation charge capacity and thus the saturation output of the image sensing device in the full frame reading mode. In the conventional technique, the saturation output in the full frame reading mode is as small as half that in the field reading mode, and thus the output must be amplified with a greater gain than in the field reading mode, which results in a reduction in the signal-to-noise ratio. In contrast, the present invention can provide as high a signal-to-noise ratio in the full frame reading mode as in the field reading mode. Thus, in the digital still camera according to the present invention, it is possible to obtain a high-quality image regardless of whether the operation is performed in the field reading mode or in the full frame reading mode.

EMBODIMENT 9

Figure 27:
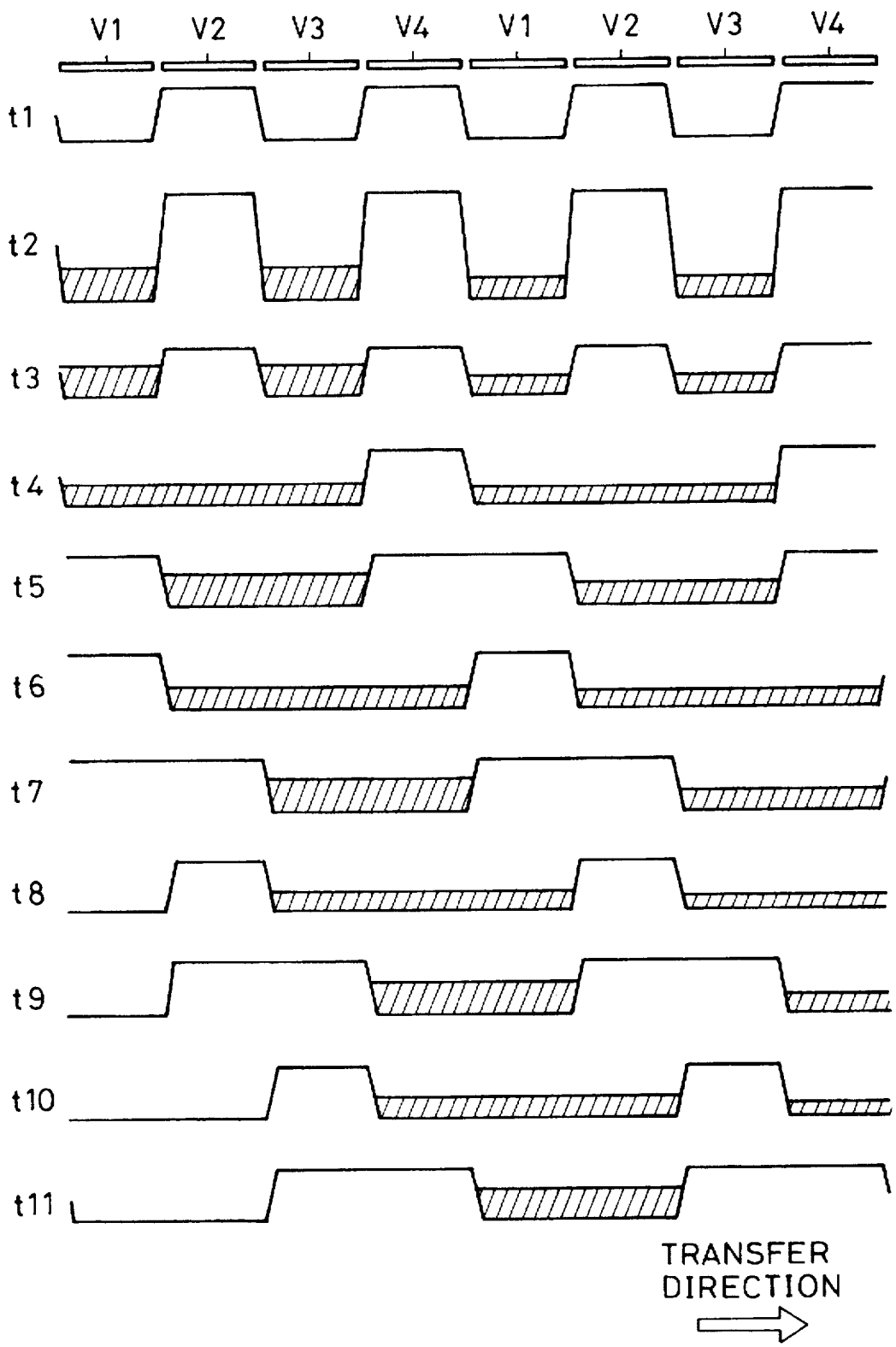
FIG. 27 is a schematic representation of potential profiles of an image sensing device according to the ninth embodiment of the invention.

In a ninth embodiment of the invention described below referring to FIGS. 26 and 27, the saturation charge capacity of an image sensing device in the field reading mode is improved. FIG. 26 is a timing chart of pulses applied to various gates during an operation of reading a signal charge from a photoelectric conversion cell into a VCCD in the full frame reading mode according to the ninth embodiment, wherein FIG. 26(1) is a timing chart relating to a first-field reading operation, and FIG. 26(2) is a timing chart relating to a second-field reading operation. FIG. 27 illustrates potential profiles corresponding to FIG. 26(1). In this embodiment, there is no essential difference in the basic operation between the first-field reading operation and the second-field reading operation, and therefore the potential profiles are shown only for the first-field reading operation.

In movie video cameras, a quasi interlace operation is achieved by alternately performing the first-field reading operation and the second-field reading operation. In contrast, in common still cameras, only the first-field reading operation or the second-field reading operation is required.

The present embodiment is based on the principle employed in the full frame reading operation according to the eighth embodiment described above.

That is, signal charges of Cy and Ye cells and signal charges of G and Mg cells are read into V1 and V3, respectively, wherein V1 and V3 also act as reading gates. Immediately after that, either V2 or V4 is depleted so that signal charges in the preceding and succeeding stages are added together and thus the mixed charges are stored together in the three successive charge transfer cells. In the conventional technique, the reading pulses for reading signal charges from photoelectric conversion cells to VCCDs are applied successively to V1 and V3. However, in this embodiment, if the application of pulses in a successive fashion is employed, it is impossible to form a potential well for storing signal charges together in a time period less than a few hundred nsec after the end of the reading pulse. To avoid this problem, reading pulses in phase are applied to V1 and V3.

According to the above arrangement, the saturation charge capacity of the image sensing device even in the field reading mode is limited by the maximum charge transfer capacity of VCCDs rather than the saturation charge capacities of individual charge transfer cells and thus it is possible to increase the saturation charge capacity of the image sensing device.

EMBODIMENT 10

Referring to FIGS. 28 and 29, a tenth embodiment of the invention is described below. FIG. 28 is a timing chart of pulses applied to various gates during an operation of reading a signal charge from a photoelectric conversion cell into a VCCD in the full frame reading mode according to the tenth embodiment, wherein FIG. 28(1) is a timing chart relating to a first-field reading operation, and FIG. 28(2) is a timing chart relating to a second-field reading operation. FIG. 29 illustrates potential profiles corresponding to FIG. 28(1).

The present embodiment is based on the same principle as the sixth and seventh embodiments. The signal charge of a photoelectric conversion cell is transferred into a potential well formed by three charge transfer cells thereby expanding the saturation charge capacity of the image sensing device without limitation by the saturation charge capacity of one charge transfer cell. However, it should be noted here that at the time t4, one charge transfer cell has to include signal charges coming from two photoelectric conversion cells, as can be seen from the potential profile shown in FIG. 29. In some cases, the saturation charge capacity of a image sensing device may be limited by the above-described maximum charge storage capacity at the time t4. Therefore, this tenth embodiment has some limitation in the applicability of the invention, whereas this embodiment is useful if it is applied to a properly designed image sensing device.

In this embodiment, the signal charges are stored in a potential well formed by three charge transfer cells regardless of whether the signal charges are read via V1 or V3. Alternatively, the signal charges obtained in the first reading process may be stored in a potential well formed by two charge transfer cells (this can be achieved, for example, by forming a potential barrier under the electrode V3 at t1 and t3).

According to the ninth or tenth embodiment described above, the saturation charge capacity of the image sensing device can be increased even in the field reading mode.

EMBODIMENT 11

An eleventh embodiment of the invention is described below.

In a camera according to this embodiment, a first picture-taking operation is performed in the field reading mode, whereas the subsequent picture-taking operation is performed in the full frame reading mode.

In the first picture-taking operation may be performed according to either the conventional field reading technique or the reading technique of the ninth or tenth embodiment of the present invention. The second picture-taking operation may be performed according to any one of the sixth, seventh, and eighth embodiments of the present invention. Before starting the second picture-taking operation, both Vm and Vsub are reduced within the limits that can provide an acceptable high charge transfer efficiency compared to that in the first picture-taking operation. In the second picture-taking operation, the image sensing device is not exposed to light via a mechanical shutter.

In the digital camera according to the present embodiment of the invention, the above-described technique of driving the image sensing device makes it possible to obtain the same gain in the output signal of the image sensing device both in the first and second picture-taking operations thereby obtaining high-quality images having a high signal-to-noise ratio both in the first and second picture-taking operations.

In the embodiments described above, it is assumed that the image sensing device is provided with a color filter of the line-sequential color difference type. However, the color filter is not limited to this type. The color filter may be eliminated, if desired. Furthermore, various reading modes such as a full frame reading mode in which odd numbered lines and even numbered lines are read separately, a field reading mode in which odd numbered lines and even numbered lines are added together in a transfer register and then read out, and non-interlace reading mode in which information is read successively from a line to the next line, can be employed. What is essential in this invention is in that the saturation charge capacity during a reading operation is not limited by the capacity of potential wells of the transfer register.

As described above, the present invention provides an improved reading technique with a high saturation charge capacity of an image sensing device. The present invention can offer a great advantage especially in a full frame reading operation using an image sensing device provided with a color filter of the line-sequential color difference type. In particular, the present invention makes it possible to take a high-resolution picture using a digital still camera having a low-cost image sensing device of the type widely used in movie video cameras.

What is claimed is:

1. An image pick-up apparatus comprising:
    an image sensing device for converting an optical image into an electrical signal, said image sensing device including a photoelectric conversion part and a vertical transfer part;
    mode switching means for switching an operation mode between a frame mode and field mode; and
    control means for controlling the bias level and/or a timing of a vertical transfer pulse depending on the operation mode selected via said mode switching means,
    wherein said control means gives a predetermined amount of shift to an intermediate level of a transfer pulse used to drive a vertical transfer part adjacent to a photoelectric conversion part, and said control means also gives the same amount of shift to intermediate levels of transfer pulses used to drive other vertical transfer parts, and
    wherein said control means further includes a plurality of shifting circuits for determining the amount of shift given to the individual vertical transfer pulses, said plurality of shifting circuits being connected to the same power supply source used in common.

2. An image pick-up apparatus according to claim 1, wherein said plurality of shifting circuits have substantially the same dependence of temperature on their outputs.

3. An image pick-up apparatus according to claim 1, wherein said control means switches an intermediate level of a transfer pulse used to drive a vertical transfer part adjacent to a photoelectric conversion part, and said control means also gives the same amount of shifts as that given to the intermediate level to the high and low levels of the transfer pulse.

4. An image pick-up apparatus according to claim 1, wherein said control means controls the width of a reading pulse used to read a signal charge from the photoelectric part into the vertical transfer part.

5. An image pickup apparatus according to claim 1, wherein said control means also controls the potential of a substrate of the image sensing device depending on the operation mode.

* * * * *

UNITED STATES PATENT AND TRADEMARK OFFICE
CERTIFICATE OF CORRECTION

PATENT NO. : 5,786,852

DATED : July 28, 1998

INVENTOR(S): MASAO SUZUKI ET AL.

Page 1 of 5

It is certified that error appears in the above-identified patent and that said Letters Patent is hereby corrected as shown below:

ON TITLE PAGE

[56] References Cited  "60141081" should read --60-141081--;
                      "05211320" should read --5-211320--; and
                      "05227487" should read --5-227487--.

COLUMN 1

Figure 7:
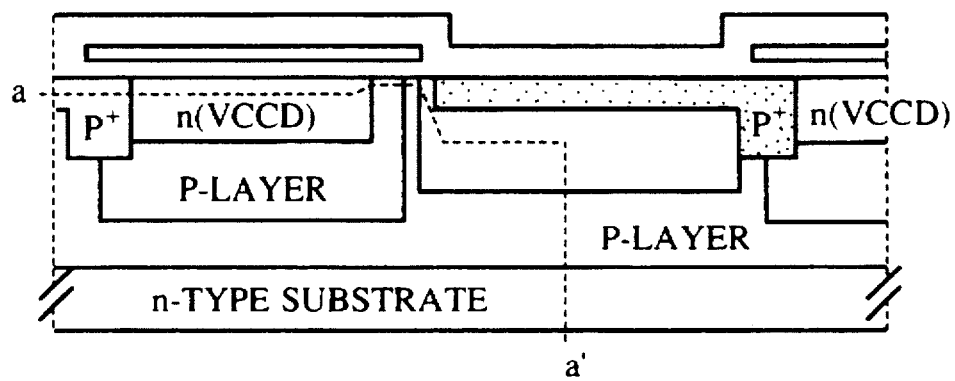
Figure 7:
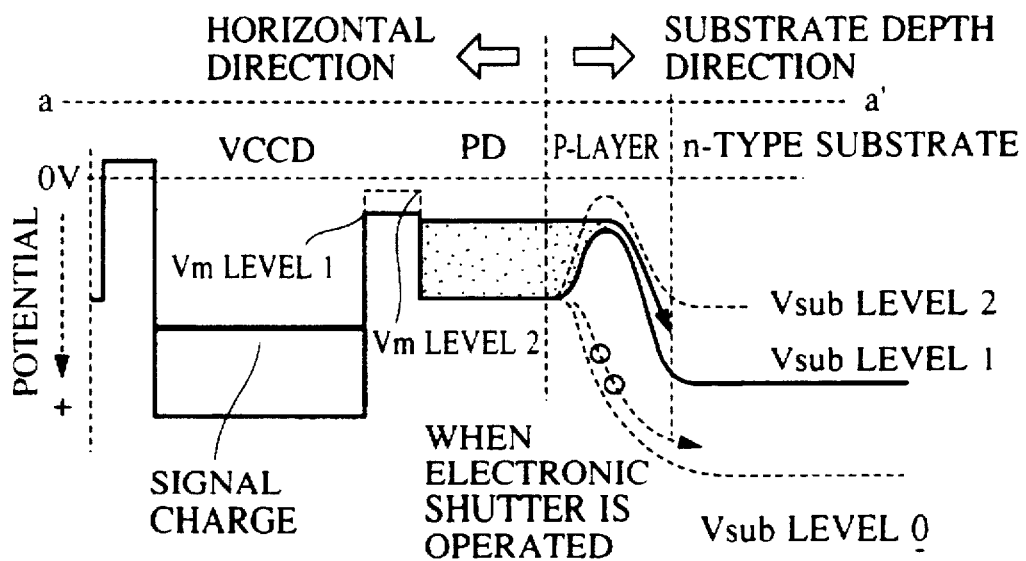
Figure 7D:
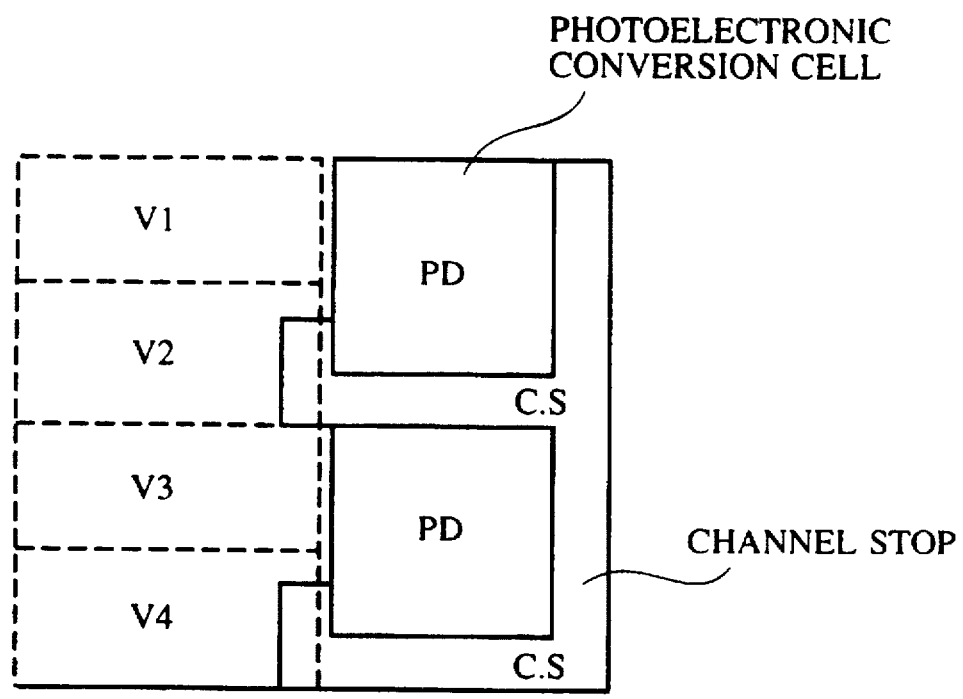
FIG. 7d illustrates an electrode arrangement.

```
line 40,   "FIG. 7b" should read --FIG. 7(B)--;
line 41,   "FIG. 7c" should read --FIG. 7(C)--;
line 42,   "FIG. 7d" should read --FIG. 7(D)--;
line 44,   "has" should read --have--; and
line 50,   "FIG. 7," should read --FIG.7(A),--.
```

COLUMN 3

```
line 5,    "FIG. 7c" should read --FIG. 7(C)--; and
line 8,    "FIG. 7c," should read --FIG. 7(C),--.
```

UNITED STATES PATENT AND TRADEMARK OFFICE
CERTIFICATE OF CORRECTION

PATENT NO. : 5,786,852

DATED : July 28, 1998

INVENTOR(S): MASAO SUZUKI ET AL.

It is certified that error appears in the above-identified patent and that said Letters Patent is hereby corrected as shown below:

COLUMN 6 line 4,   "FIG. 7a" should read --FIG. 7(A)-- and "FIG. 7b" should read --FIG. 7(B)--;
   line 5,   "FIG. 7c" should read --FIG. 7(C)--;
   line 6,   "FIG. 7d" should read --FIG. 7(D)--;
   line 18, "FIG. 13 is" should read --FIGS.13(A) and 13(B) are--;
   line 20, "FIG. 14 is" should read --FIGS. 14(A) and 14(B) are--; and
   line 59, "FIG. 29 is" should read --FIGS. 29(A) and 29(B) are--.

COLUMN 8 line 56, "achieving" should read --achieve--.

COLUMN 11 line 56, "FIGS. 7b, 7c, 7d," should read --FIGS. 7(B), 7(C), 7(D),--;
   line 62, "FIG. 7c." should read --FIG. 7(C).--

UNITED STATES PATENT AND TRADEMARK OFFICE
CERTIFICATE OF CORRECTION

PATENT NO. : 5,786,852

DATED : July 28, 1998

INVENTOR(S): MASAO SUZUKI ET AL.

It is certified that error appears in the above-identified patent and that said Letters Patent is hereby corrected as shown below:

COLUMN 12 line 1, "FIG. 7d)." should read --FIG.7(D)).--;
line 16, "cameral" should read --camera--;
line 43, "FIG. 7c." should read --FIG. 7(C).--;
line 51, "FIG. 7c" should read --FIG. 7(C)--; and
line 57, "FIG. 7c." should read --FIG. 7(C)--.

COLUMN 13 line 4, "FIG. 7d." should read --FIG. 7(D).--;
line 24, "FIG. 7a." should read --FIG. 7(A).--;
line 40, "FIG. 13a." should read --FIG. 13(A).--;
line 47, "FIG. 13b." should read --FIG. 13(B).--; and
line 58, "ranges" should read --range--.

COLUMN 14 line 21, "FIGS. 14a and 14b" should read --FIGS. 14(A) and 14(B)--;
line 64, "FIGS. 7b or 7c" should read --FIGS. 7(B) or 7(C))--; and
line 65, "FIG. 7b or 7c)" should read --FIGS. 7(B) or 7(C))--.

UNITED STATES PATENT AND TRADEMARK OFFICE
CERTIFICATE OF CORRECTION

PATENT NO. : 5,786,852

DATED : July 28, 1998

INVENTOR(S) : MASAO SUZUKI ET AL.

It is certified that error appears in the above-identified patent and that said Letters Patent is hereby corrected as shown below:

COLUMN 15 line 7,   "FIG. 7d)" should read --FIG. 7(D))--.

COLUMN 16 line 33, "FIG. 14a)," should read --FIG. 14(A)),--.

COLUMN 17 line 13, "FIG. 14a," should read --FIG. 14(A),--.

COLUMN 18 line 62, "Alternative," should read --alternatively,--.

COLUMN 20 line 7,   "combination of V2, V2," should read --combination of V2, V3--; and "Alternative," should read --Alternatively,--.

UNITED STATES PATENT AND TRADEMARK OFFICE
CERTIFICATE OF CORRECTION

PATENT NO. : 5,786,852

DATED : July 28, 1998

INVENTOR(S) : MASAO SUZUKI ET AL.

It is certified that error appears in the above-identified patent and that said Letters Patent is hereby corrected as shown below:

COLUMN 21 line 63, "embodiment,." should read --embodiment,--.

COLUMN 22 line 10, "a image" should read --an image--.

Signed and Sealed this

Twenty-ninth Day of June, 1999

Attest:

Q. TODD DICKINSON

*Attesting Officer*   Acting Commissioner of Patents and Trademarks